(12) United States Patent
Jacobs

(10) Patent No.: US 11,112,509 B2
(45) Date of Patent: Sep. 7, 2021

(54) MULTIFUNCTIONAL RADIATION DETECTOR

(71) Applicant: KONINKLIJKE PHILIPS N.V., Eindhoven (NL)

(72) Inventor: Johannes Wilhelmus Maria Jacobs, Boxtel (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 82 days.

(21) Appl. No.: 16/302,689

(22) PCT Filed: May 22, 2017

(86) PCT No.: PCT/EP2017/062200
§ 371 (c)(1),
(2) Date: Nov. 19, 2018

(87) PCT Pub. No.: WO2017/202738
PCT Pub. Date: Nov. 30, 2017

(65) Prior Publication Data
US 2019/0120977 A1   Apr. 25, 2019

(30) Foreign Application Priority Data
May 26, 2016  (EP) .................................. 16171487

(51) Int. Cl.
*G01T 1/20* (2006.01)
*G01T 1/24* (2006.01)
*G01T 1/29* (2006.01)

(52) U.S. Cl.
CPC ............ *G01T 1/2018* (2013.01); *G01T 1/247* (2013.01); *G01T 1/2928* (2013.01)

(58) Field of Classification Search
CPC .......... G01T 1/20; G01T 1/24; G01T 1/2018; G01T 1/2928; G01T 1/247; G01T 1/242
USPC ............... 250/370.08, 370.09, 370.1, 370.11
See application file for complete search history.

(56) References Cited

U.S. PATENT DOCUMENTS

| 6,181,769 B1 | 1/2001 | Hoheisel et al. |
| 8,513,612 B2 | 8/2013 | Levene et al. |
| 2003/0155516 A1 | 8/2003 | Spartiotis et al. |
| 2004/0238750 A1 | 12/2004 | Vafi et al. |
| 2007/0164223 A1 | 7/2007 | Hennessy et al. |
| 2009/0095914 A1 | 4/2009 | Goo et al. |
| 2010/0078573 A1 | 4/2010 | Nishino et al. |
| 2010/0166137 A1 | 7/2010 | Sawanaga |
| 2012/0153163 A1 | 6/2012 | Levene et al. |

(Continued)

FOREIGN PATENT DOCUMENTS

| EP | 1521100 A2 | 4/2005 |
| JP | 2001095789 A | 4/2001 |

(Continued)

*Primary Examiner* — Jurie Yun
(74) *Attorney, Agent, or Firm* — Larry Liberchuk

(57) ABSTRACT

A multi-functional and multi-modality radiation detector (10) is provided. The radiation detector (10) comprises at least two detector units (12a, 12b) having photosensitive pixels (14) and at least one scintillation device (20) optically coupled to the photosensitive pixels (14). The detector units (12a, 12b) are arranged next to each other on a substrate foil (24). Therein, the scintillation devices (20) of the detector units (12a, 12b) are spaced apart from each other, such that the radiation detector (10) is bendable. This allows the radiation detector (10) to be used in many different geometrical configurations.

17 Claims, 11 Drawing Sheets

(56) References Cited

U.S. PATENT DOCUMENTS

2015/0181700 A1 6/2015 Rogers et al.
2016/0070006 A1 3/2016 Konkle et al.

FOREIGN PATENT DOCUMENTS

JP 2013253887 A 12/2013
WO WO2015138320 A1 9/2015

MULTIFUNCTIONAL RADIATION DETECTOR

FIELD OF THE INVENTION

The invention relates to the field of radiation detectors. More specifically, the invention relates to a multifunctional radiation detector and a method for producing such radiation detector.

BACKGROUND OF THE INVENTION

Radiation detectors are used in many applications ranging from scientific applications, space applications to medical applications. Depending on the application and constraints inferred therewith, such as e.g. particle energies which are to be measured, radiation detectors can reach large sizes.

US 2010/0078573 A1 discloses a radiation detecting apparatus including a flexible radiation detector for detecting radiation that has passed through a subject and converting the detected radiation into radiation image information.

SUMMARY OF THE INVENTION

There may therefore be a need for a multi-purpose, multifunctional, more compact, robust and cost efficient radiation detector.

The object of the present invention is solved by the subject-matter of the independent claims, wherein further embodiments are incorporated in the dependent claims.

According to a first aspect of the invention, a radiation detector is provided. The radiation detector comprises a plurality of detector units, which detector units each comprise a plurality of photosensitive pixels, and which detector units each comprise at least one scintillation device optically coupled to the plurality of photosensitive pixels. The radiation detector further comprises a substrate foil for carrying the detector units.

Therein, detector units are arranged in juxtaposition on the substrate foil. Further, at least two directly adjoining scintillation devices of at least two directly adjoining detector units are spaced apart from each other, such that the radiation detector is bendable and/or foldable along at least a part of a bending region of the substrate foil, which bending region is arranged between said at least two directly adjoining scintillation devices.

According to an example of the first aspect of the invention, the radiation detector further comprises at least one addressing circuit for addressing the detector units and at least one signal read-out circuit for reading-out signals from the detector units.

According to another example of the first aspect of the invention, each detector unit comprises a separate addressing circuit and/or a separate signal read-out circuit.

According to a second aspect, a radiation detector arrangement is provided, which comprises a plurality of radiation detectors as described above and in the following.

According to a third aspect, a method for producing a radiation detector as described above and in the following is provided.

It should be noted that features and/or elements of the radiation detector as described above and in the following may be features and/or elements of the radiation detector arrangement and/or the method. Vice versa, features of the radiation detector arrangement and/or the method as described above and in the following may be features and/or elements of the radiation detector.

Here and in the following, the term "photosensitive pixel" may refer to an element for detecting electromagnetic radiation and/or for detecting an electromagnetic signal, such as light. Each of the pixels may detect electromagnetic radiation independently. However, also a plurality of subpixels may be electronically interconnected to form a single photosensitive pixel. Such arrangement may also be called a binned pixel.

Here and in the following, the term "scintillation device" may refer to a device comprising scintillation material, such as e.g. CsI, GOS (Gadolinium Oxysulfide), garnet (e.g. LGGAG, Lutetium Gadolinium Gallium Aluminum Garnet), and/or NaI, which scintillation material can be excited by photons and/or charged particles, and which de-excites by the emission of electromagnetic radiation, such as light.

Here and in the following the term "optically coupled" may refer to optically connected, such that electromagnetic radiation emitted by the scintillation device and/or the scintillation material may be transmitted to and/or impinge on the photosensitive pixels in order to be detected.

Further, the term "substrate foil" may refer to a flat and/or planar carrier element for carrying the detector subunits. Particularly the substrate foil may be a thin foil, e.g. comprising polymer material and/or metal, having a thickness ranging from several μm to several thousand μm, for example from 10 μm to 1000 μm, and preferably from 10 μm to 100 μm. Particularly, the substrate foil may have a thickness of about 25 μm. Further, the substrate foil may be flexible, which may mean that it may be bendable and/or foldable without any deterioration e.g. way more than $10^5$ times.

Further, the term "bendable" may refer to the radiation detector being foldable without deterioration. In other words, the radiation detector may be folded and/or convolved deterioration-free and/or wearlessly and/or wear-free e.g. way more than $10^5$ times.

Moreover, the term "in juxtaposition" may mean that the detector units are arranged next to each other and/or arranged adjacently with respect to each other.

The term "two directly adjacent detector units" may refer to a first and a second detector unit, wherein the first detector unit may comprise a first edge and/or border arranged opposite to a second edge and/or border of the second detector unit. Thus, the first edge of the first detector unit may face the second edge of the second detector unit.

The term "two directly adjacent scintillation devices" may refer to a first and a second scintillation device, wherein the first scintillation device may comprise a first edge and/or border arranged opposite to a second edge and/or border of the second scintillation device. Thus, the first edge of the first scintillation device may face the second edge of the second scintillation device.

Re-phrasing the first aspect of the invention, the detector may comprise various, i.e. at least two, detector units for detecting radiation. The detector units may each comprise various, i.e. at least two, photosensitive pixels and at least one scintillation device. The detector units may for instance be configured for detecting photons and/or any other radiation particles capable of exciting the scintillation device, such as charged particles like electrons, positrons and/or alpha-particles, in order to generate an electromagnetic signal, such as e.g. a light output and/or a light signal, which may be detected by the photosensitive pixels. Therein, the photosensitive pixels of each detector unit may be arranged in an arbitrary pattern, such as e.g. in one or more columns and/or in one or more rows. The detector units may be arranged next to each other on a side and/or on a surface, e.g.

an outer surface, and/or on top of the substrate foil. The detector units may be arranged in an arbitrary pattern on the substrate foil, such as e.g. in a row, in a triangle, in a rectangle and/or in a circle. The detector units may also be arranged with a certain offset and/or shift with respect to each other.

At least two directly neighboring detector units may be spaced apart from each other, such that a gap, a spacing and/or an interspace is formed between the scintillation devices of those neighboring detector units and/or between opposing borders/edges of the scintillation devices of those two detector units. The gap may be free from any further element of the radiation detector, i.e. the gap may be obstacle-free. In particular, no parts of the scintillation device may be present within the gap and/or the interspace. The at least two neighboring scintillation devices and/or their directly opposing edges may be spaced apart from each other by at least 0.1 cm, preferably at least 1 cm. However, depending on a thickness of the scintillation devices, the scintillation devices may be spaced apart from each other by 1 cm to 30 cm, for example 3 cm to 20 cm, and preferably 5 cm to 15 cm. The bending region of the substrate foil may thus refer to a region and/or an area of the substrate foil arranged within the gap. Accordingly, the bending region may denote a region of the substrate foil bordering and/or defining the gap.

By spacing apart the directly neighboring scintillation devices of the directly neighboring detector units, the radiation detector may advantageously be bendable and/or foldable along at least a part of that bending region and/or along the gap. In other words, the radiation detector may advantageously be bendable within the bending region and/or gap. This in turn may allow to arbitrarily fold the radiation detector in various configurations and/or geometrical arrangements of the at least two neighboring detector units with respect to each other. This way, the radiation detector may for instance be folded to a compact configuration, e.g. in order to transport or store it, and it may be unfolded temporarily when in use. Also, the radiation detector may advantageously be adapted in terms of a configuration and/or geometrical arrangement of the detector units with respect to each other according to specific applications. For instance, in medical applications the geometry of the radiation detector may be adapted according to a patient-specific geometry. However, the radiation detector may also be advantageously applied in other applications such as scientific applications, e.g. at particle accelerators. The radiation detector may also be used in space applications, where it e.g. may be transported to space in folded configuration and then unfolded in space.

Particularly referring to medical applications compared to a rigid geometry of a common single flat large detector, which may put restrictions on e.g. X-ray imaging and patient access, the inventive radiation detector may allow flexible positioning of the smaller detector units, basically at any desired angle with respect to each other, which may enable new imaging opportunities.

Further, compared to common or standard imaging systems with large-area and/or multiple detectors, such as e.g. spine imaging neuro biplane applications, the inventive radiation detector may enable a design of more compact and more cost-efficient imaging systems providing higher system mobility.

Moreover, a common or standard large-size rigid flat detector may limit access of a physician or other medical devices to a patient during a significant portion of an imaging procedure. In contrast, the inventive radiation detector may only limit patient access during a short period of time when the detector is unfolded.

Apart from that, a common or standard large size bulk detector may limit portability and/or mobility of the detector and/or the imaging system, whereas the foldable concept of the inventive radiation detector may allow for a compact and/or mobile design of the radiation detector and/or an imaging system equipped with it.

According to an embodiment, the radiation detector is bendable with a bending angle enclosed by said at least two directly adjoining and/or directly neighboring detector units, wherein the bending angle ranges from about 0° to about 360°. This range of the bending angle may refer to a start geometry, in which the radiation detector may be in a folded geometry. However, assuming a completely unfolded and/or flat geometry as start geometry, the maximum bending angle may be up to about +/−180°. By providing a radiation detector, in which the detector units may be arranged arbitrarily over such broad range of angles with respect to each other, a configurational and/or geometrical flexibility of the entire radiation detector may be further increased.

According to an embodiment, the radiation detector comprises a single substrate foil. In other words, the substrate foil may be a common substrate foil forming a common carrier element for the detector units. The substrate foil may e.g. be a monolithic substrate foil. This way, a cost efficient, light-weight, durable and/or robust radiation detector may be provided.

According to an embodiment, the substrate foil comprises polymer material. The substrate foil may e.g. comprise Polylmide (PI), PolyTetraFluoroEthylene (PTFE), PolyEthylene Therephtalate (PET), PolyEthylene Naphtalate (PEN), and/or any combination thereof. Such material may provide a low weight as well as a high degree in flexibility and robustness, such that the substrate foil and/or the radiation detector may be folded nearly arbitrarily often without any material deterioration and/or degradation.

According to an embodiment, each of the detector units comprises an array of photosensitive pixels. An array of pixels may refer to pixels arranged in several rows and columns forming a homogenous pattern of pixels. Such array may particularly be advantageous in terms of a spatial resolution of the radiation detector.

According to an embodiment, each of the photosensitive pixels comprises at least one Thin-Film-Transistor (TFT) element. Such TFT elements and/or pixels may be characterized in that they can be cheaply produced in large numbers, provide a long lifetime, are nearly maintenance-free, have a small thickness, and in that they can be manufactured in various thickness and/or sizes in order to meet specific requirements of the radiation detector and/or the respective detector units.

According to an embodiment, at least one of the plurality of detector units has a curved shape. In other words, at least one of the plurality of detector units may have a curved outer surface and/or a curved outer geometry. Alternatively, all of the plurality of detector units may have a curved shape. Depending on a geometry of a radiation source and/or on impinging directions of radiation particles impinging onto the radiation detector, the curved shape of the detector units or at least a part thereof may simplify post-processing of a radiation image captured with the radiation detector.

According to an embodiment, the photosensitive pixels and/or each detector unit comprise a photodiode. By means of the photodiode, an electromagnetic radiation or signal emitted from the scintillation device may be converted to an electric signal, e.g. a current and/or a voltage, which electric signal may in turn be transferred to a signal read-out circuit and/or signal read-out electronics of the radiation detector via at least one TFT element. Therein, the TFT element may serve as a switch or switch element. For instance, the electric signal may be transferred and/or transmitted to a data line of the radiation detector. Further, the electric signal may be amplified by means of a TFT circuit, which may comprise a plurality of TFT elements.

According to an embodiment, the radiation detector further comprises at least one addressing circuit for addressing the detector units and at least one signal read-out circuit for reading-out signals from the detector units. Accordingly, the radiation detector may comprise one or more addressing circuits and/or one or more signal read-out circuits. By way of example, at least a part of the detector units may be electronically interconnected and share one addressing circuit and/or one signal read-out circuit.

According to an embodiment, each detector unit comprises a separate addressing circuit and/or a separate signal read-out circuit. Accordingly, each detector unit may be configured to be operated independently and/or separately with respect to all other detector units. Apart from providing flexibility in terms of image acquisition, this may also advantageously reduce a signal-to-noise ratio, since rather short wires may be used for connecting the respective circuits with the detector units and/or the photosensitive pixels comprised therein. Thus, a performance of the radiation detector and/or the detector units may be increased. Further, equipping each of the detector units with a separate periphery electronics for addressing and/or signal data read-out, i.e. the addressing circuit and/or the signal read-out circuit, may enable the detector units to be operated individually and e.g. acquire images from different radiation exposures. Images of the detector units may be acquired simultaneously and/or sequentially. Further, images acquired with different detector units may be merged and/or processed and/or reconstructed to generate anatomical and/or functional information, e.g. of a patient.

According to an embodiment, each of the separate signal read-out circuits is arranged on a separate electronics carrying region of the substrate foil. Also each of the separate addressing circuits may be arranged on a separate electronics carrying region of the substrate foil. This way, the length of electrical wiring lines and hence a signal-to-noise ratio may be further reduced.

According to an embodiment, the radiation detector further comprises a switch element arranged between two, e.g. directly adjoining, detector units, wherein the switch element is configured for interconnecting and/or decoupling the two detector units. The switch element may for instance comprise a global data line switch allowing to switchably interconnect and/or decouple said two detector units. This may enable individual and autonomous operation of each detector unit and may avoid cross-talk between detector units. Further, this may reduce excessive noise caused by long data lines.

According to an embodiment, a first detector unit is configured for detecting radiation in a first energy range, wherein a second detector unit is configured for detecting radiation in a second energy range, which second energy range at least partly differs from the first energy range. The first and second energy range may at least partly overlap. This way, a multifunctional radiation detector may be provided capable of detecting particles, such as photons, in various energy ranges, and thereby providing further information for image acquisition. For instance, the first detector unit may be an X-ray detector unit configured for detecting X-rays and the second detector unit may be a γ-ray detector unit configured for detecting γ-rays. There may be a plurality of such first and second detector units, respectively. Also all detector units may be configured for detecting different energies. For instance, in dual energy X-ray imaging, the first detector unit may be configured for detecting mainly low-energy X-rays, so-called soft X-ray radiation, and the second detector unit, which may be positioned behind the first detector unit with respect to a flight path of the radiation particles, may be configured for detecting mainly high-energy X-rays, so-called hard X-ray radiation. In order to provide sensitivity in different energy ranges, the first and second detector units may e.g. differ in pixel size, in scintillation material, in thickness of the scintillation device and/or a scintillation layer comprised therein and/or in the electronics, i.e. the addressing and/or signal read-out circuits. For detecting higher energies, e.g. larger pixels may be used and/or a thicker scintillation layer comprised in the scintillation device may be used.

According to an embodiment, at least one of the plurality of detector units is an X-ray detector unit configured for detecting X-rays and arranged in a center region of the substrate foil, wherein at least two of the plurality of detector units are γ-ray detector units, arranged on opposite sides and/or on two opposite sides of the X-ray detector unit. Accordingly, the X-ray detector unit may be bordered by the at least two γ-ray detector units. This may provide multi-modality and multi-functionality to the radiation detector.

According to an embodiment, at least one scintillation device of each detector unit comprises a scintillation layer arranged on top of, e.g. on a surface of, at least a part of the plurality of photosensitive pixels. Further, the scintillation layer may be flexible, i.e. the scintillation layer may be bendable by a certain degree without deterioration. This, may further increase a robustness, flexibility and/or foldability of the entire radiation detector. Further, a flexible scintillation layer may facilitate and/or enable realization of detector units with curved shape. The scintillation layer may comprise CsI, GOS, garnet, and/or NaI material.

According to an embodiment, an edge of the scintillation device is tapered. This may further increase the bending, thereby further increasing foldability.

According to the second aspect, a radiation detector arrangement is provided, which comprises a plurality of radiation detectors as described above and in the following.

According to an embodiment, at least two substrate foils of the plurality of radiation detectors are interconnected with each other. In other words, at least two of the plurality of radiation detectors may be interconnected with each other. Such interconnection may comprise a mechanical interconnection of the respective substrate foils of the at least two radiation detectors. The substrate foils may be glued, welded and/or taped together. The substrate foils may also be interconnected by thermofusion process, i.e. by means of a heat seal and compression. Edges of the respective substrate foils may be arranged flush and/or they may at least partly overlap. Further, the plurality of radiation detectors of the radiation detector arrangement may be electronically interconnected, e.g. by means of so-called Through-Foil-Via (TFV), wire bonding and/or by printing conductive lines, e.g. ink-based. This way, an overall size of the radiation detector arrangement as well as a multi-functionality may further be increased.

According to the third aspect, a method for producing a radiation detector is provided. The method comprises the step of providing a substrate foil and a plurality of detector units, which detector units each comprise a plurality of photosensitive pixels and which detector units each comprise at least one scintillation device optically coupled to the plurality of photosensitive pixels. Further, the method comprises the step of arranging the plurality of detector units on the substrate foil in juxtaposition with each other, such that at least two directly adjoining and/or neighboring and/or adjacently arranged scintillation devices of at least two directly adjoining and/or neighboring and/or adjacently arranged detector units are spaced apart from each other by a gap, such that the radiation detector is bendable and/or foldable along at least a part of the gap.

These and other aspects of the invention will be apparent from and elucidated with reference to the embodiments described hereinafter.

BRIEF DESCRIPTION OF THE DRAWINGS

The subject matter of the invention will be explained in more detail in the following with reference to exemplary embodiments which are illustrated in the attached figures, wherein.

In principle, identical parts are provided with the same reference symbols in the figures.

DETAILED DESCRIPTION OF EMBODIMENTS

Figure 1A:
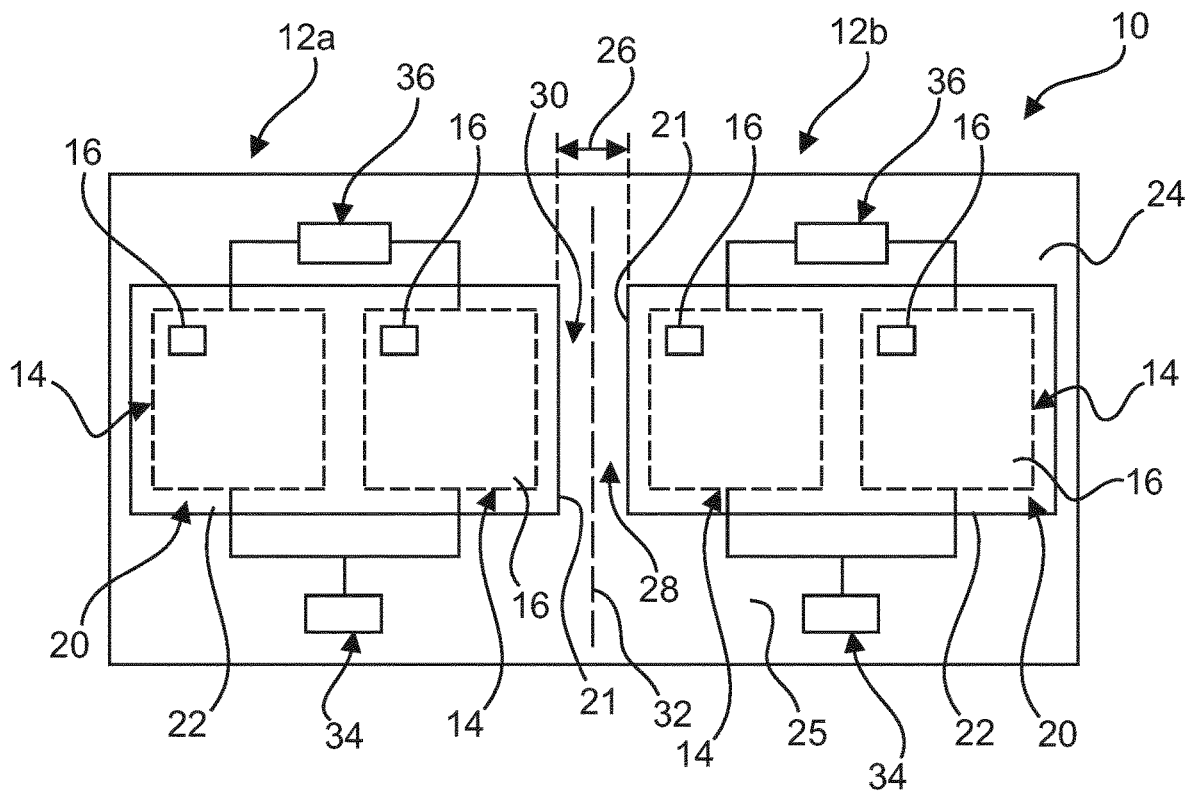
FIG. 1A shows schematically a top view of a radiation detector.
Figure 1B:
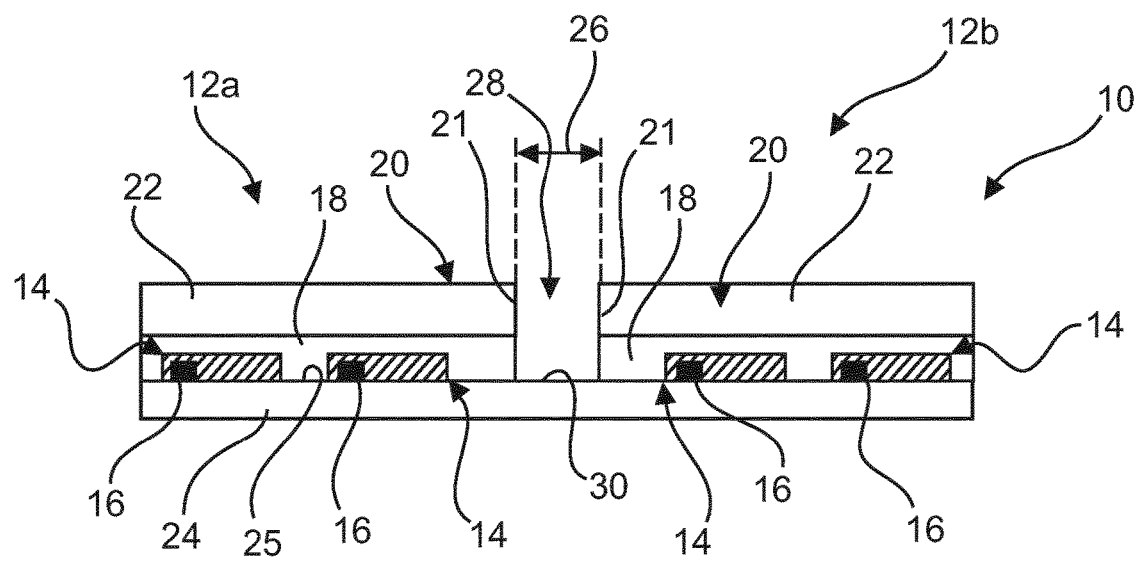
FIG. 1B shows schematically a cross-sectional view of the radiation detector of FIG. 1A.

FIG. 1A shows schematically a top view of a radiation detector 10, and FIG. 1B shows schematically a cross-sectional view of the radiation detector 10 of FIG. 1A. The radiation detector 10 comprises two detector units 12a, 12b.

Each of the detector units 12a, 12b comprise two photosensitive pixels 14, which are exemplary arranged in a row. However, the photosensitive pixels 14 may alternatively be arranged in an arbitrary arrangement with respect to each other. Each of the pixels 14 comprises at least one Thin-Film-Transistor (TFT) element 16.

Further, each of the detector units 12a, 12b comprises a photodiode 18, which at least partly covers a surface of the TFT elements 16 of each detector unit 12a, 12b. In the exemplary embodiment shown in FIGS. 1A and 1B, the pixels 14 are connected to the respective photodiode 18, wherein the photodiodes 18 basically provide photosensitivity to the pixels 14, as explained in more detail below. Alternatively, each of the detector units 12a, 12b may also comprise a plurality of photodiodes 18.

Moreover, each of the detector units 12a, 12b comprises a scintillation device 20 with a scintillation layer 22 arranged on and/or on top of the photosensitive pixels 14. The scintillation layer 22 of each detector unit 12a, 12b may be arranged on top of and/or on a surface of the respective photodiode 18. The scintillation layer 22 may for instance comprise CsI, GOS, garnet and/or NaI as scintillation material.

The detector units 12a, 12b with all the above-described components and/or elements are arranged in juxtaposition with respect to each other and/or next to each other on a flexible substrate foil 24. The detector units 12a, 12b may be at least partly arranged on a surface 25 and/or a top surface 25 and/or an outer surface 25 of the substrate foil 24. The substrate foil 24 may denote a single, large, common substrate foil 24 carrying all or most of the components of each detector unit 12a, 12b. In other words, the substrate foil 24 may be a common substrate foil 24 forming a common carrier element for the detector units 12a, 12b. The substrate foil 24 may e.g. be a monolithic substrate foil 24. Further, the substrate foil 24 may comprise polymer material, such as e.g. Polylmide (PI), PolyTetraFluoroEthylene (PTFE), PolyEthylene Therephtalate (PET), PolyEthylene Naphtalate (PEN), and/or any combination thereof. The substrate foil 24 is flexible, such that it may be bended and/or folded e.g. way more than $10^5$ times without noticeable deterioration and/or degradation. The substrate foil 24 may have a thickness ranging from several µm to several thousand µm, for example from 10 µm to 1000 µm, and preferably from 10 µm to 100 µm. Particularly, the substrate foil 24 may have a thickness of about 25 µm.

In order to make use of the flexibility of the substrate foil 24 and/or in order to provide foldability and/or bendability to the radiation detector 10, the two detector units 12a, 12b, which are neighboring each other and/or which are adjacently arranged on the substrate foil 24 are spaced apart from each other by a distance 26, indicated by the arrow in FIGS. 1A and 1B. More precisely, the two directly adjoining scintillation devices 20 of the respective detector units 12a, 12b are spaced apart by the distance 26, wherein the distance 26 may be measured parallel to the surface 25 of the substrate 24 from edges 21 and/or borders 21 of the scintillation device 20 and/or the scintillation layer 22, which edges/borders 21 are opposing each other and/or facing each other. In other words, the edges/borders 21 are arranged opposite to each other. The distance 26 may at least be 0.1 cm, preferably at least 1 cm. However, depending on a thickness of the scintillation devices 20, the distance 26 may range from 1 cm to about 30 cm, for example 3 cm to 20 cm, and preferably 5 cm to 15 cm. By spacing apart the directly adjoining edges/borders 21 of the scintillation device 20 by the distance 26, an interspace 28 and/or a gap 28 is formed between the scintillation devices 20. An area and/or region of the substrate foil 24 arranged within the gap 28 and/or interspace 28 is denoted as bending region 30 of the substrate foil 24. Along at least a part of the bending region 30, the radiation detector 10 is bendable and/or foldable such that the detector units 12a, 12b may basically be displaced and/or relocated with respect to each other in an arbitrary angle around an axis 32 parallel to a longitudinal extension direction of the bending region 30 and/or the gap 28, as further elucidated in following figures.

Moreover, each of the detector units 12a, 12b comprises an electronic addressing circuit 34 for addressing the pixels 14. Amongst others, the addressing circuits 34 of each detector unit 12a, 12b may be configured for driving the pixels 14, e.g. in terms of supplying electric power to these components. The addressing circuits 34 may each comprise e.g. an integrated circuit (IC).

Further, each of the detector units 12a, 12b comprises an electronic signal read-out circuit 36. The signal read-out circuits 36 may each denote a data signal read-out for data and/or signals from the pixels 14 of each of the detector units 12a, 12b, respectively. The signal read-out circuits 36 may each comprise an integrated circuit (IC) and/or an application-specific integrated circuit (ASIC). The signal read-out circuits 36 may further each comprise an analog-digital converter for converting an analog signal to a digital signal.

However, the detector units 12a, 12b, may also share a single addressing circuit 34 and/or a single signal read-out circuit 36. Thus, the detector units 12a, 12b may be electronically interconnected and share common periphery electronics of the radiation detector 10.

Both the addressing circuits 34 and the signal read-circuits 36 may be manufactured as electronic TFT backplane circuits arranged on either side of the substrate foil 24, allowing the radiation detector 10 to be bended and/or folded without performance degradation. The circuits 34, 36 of each detector unit 12a, 12b may be arranged on the same side or on separate sides of the substrate foil 24.

A working principle of the radiation detector 10 may be described as follows. Photons and/or charged particles, such as e.g. electrons, positrons and/or alpha particles, impinging on the scintillation device 20 and/or the scintillation layer 22 excite active species, such as e.g. molecules, in the scintillation layer 22, which in turn de-excite by emission of electromagnetic radiation, such as e.g. visible light. The electromagnetic radiation emitted by the scintillation layer 22 and/or the scintillator device 20 then impinges on the photodiode 18, which converts the electromagnetic radiation to an electric signal, i.e. a current and/or a voltage, which electric signal may in turn be transferred to the signal read-out circuits 36 of the radiation detector 10 via at least one of the TFT elements 16. This provides an electronic signal, which correlates with a primarily impinged radiation particle and/or the energy deposited by it in the scintillation device 20. The electronic signal may then be converted to a digital signal, which may be further processed for final image acquisition.

It should be noted here, that the two detector units 12a, 12b may be configured for detecting radiation with differing energies. By way of example, detector unit 12a may denote a first detector unit 12a configured for detecting radiation in a first energy range, and detector unit 12b may denote a second detector unit 12b configured for detecting radiation in a second energy range, which second energy range at least partly differs from the first energy range. The first and second energy range may at least partly overlap.

For instance, the first detector unit 12a may be an X-ray detector unit 12a configured for detecting X-rays and the second detector unit 12b may be a γ-ray detector unit 12b.

In order to provide sensitivity in different energy ranges, the first detector unit 12a and second detector unit 12b may e.g. differ in size of the pixels 14, in scintillation material, in thickness of the scintillation device 20 and/or the scintillation layer 22 comprised therein and/or in the electronics, i.e. the addressing circuit 34 and/or signal read-out circuit 36, respectively. For detecting higher energies, e.g. a thicker scintillation layer 22 comprised in the scintillation device 20 may be used.

Measuring and/or detecting different energies with each of the detector units 12a, 12b may advantageously provide a multi-functionality and/or multi-modality to the radiation detector 10.

In common or standard detectors, multi-functionality may only be realized by connecting separate smaller detectors closely together, which inevitably leads to high cost price.

According to the inventive radiation detector 10 described with reference to FIGS. 1A and 1B above a multi-functional radiation detector 10 can be manufactured from a single sensor-on-foil substrate 24 produced in one process manufacturing flow. Also commonly available scintillation devices 20 and/or radiation detector 10 assembly processes may be used, thereby reducing production cost for the inventive radiation detector 10.

Further, e.g. in clinical procedures with multiple imaging tasks, such as e.g. X-ray and γ-ray for SIRT, oncology IGT or the like, may require intermediate patient transport and may be time consuming using common or standard detectors.

In contrast, with the inventive multi-modality radiation detector 10 described with reference to FIGS. 1A and 1B, such procedures may be simplified and/or shortened without need for intermediate patient transport.

Moreover, common or standard radiation detectors may have one fixed combination of a sensor and a scintillator which ideally only meets requirements for an "average application". This may limit user flexibility, application range and may lead to undesired high X-ray dose usage.

In contrast, the inventive radiation detector 10 described with reference to FIGS. 1A and 1B may be equipped with multiple sensors, i.e. detector units 12a, 12b comprising multiple scintillation device 20 combinations, which may each be optimized for a specific imaging application requirement, such as for low or high dose, for low or high kV, for low or high resolution or the like. This may provide a more effective usage of radiation dose, such as X-ray dose.

Moreover, common detectors and systems may only have one imaging function, such as an X-ray function or a γ-ray function.

In contrast, as described above with reference to FIGS. 1A and 1B, the inventive radiation detector 10 provides multi-modality detection of radiation in terms of combining both X-ray and γ-ray imaging in one radiation detector 10.

Apart from that, in common detectors, repeated folding/unfolding and/or curving of a "standard" detector on a common substrate may lead to local damage of the scintillation devices and to degradation of imaging performance.

In contrast, in the inventive radiation detector 10 all detector units 12a, 12b may be flat and may only be folded at the bending region 30 and/or the gap 28 which is not covered with any scintillation device 20 and/or scintillation layer 22. This may provide a high degree in robustness and durability.

The radiation detector according to the exemplary embodiment shown in FIGS. 1A and 1B is briefly summarized in the following. As described, a design of a compact foldable radiation detector 10 is provided which can be unfolded temporary to actuate a larger configuration of multiple flat detector units 12a, 12b connected to each other. The detector units 12a, 12b can be flexibly positioned at any desired angle (i.e. bending angle 50 as shown in subsequent figures) with respect to each other, and have their own specific photosensitive pixels 14 and scintillation device 20. The basic large substrate foil 24 in the radiation detector 10 comprises a single thin plastic foil 24 on which various smaller photosensitive pixels 14 are manufactured. The large substrate foil 24 is preferably produced in one process flow using TFT backplane and photodiode manufacturing processes. A multi-functional radiation detector 10 may be realized by designing its detector units 12a, 12b so that they may be enabled to operate individually and/or acquire images e.g. from different radiation exposures.

Figure 2A:
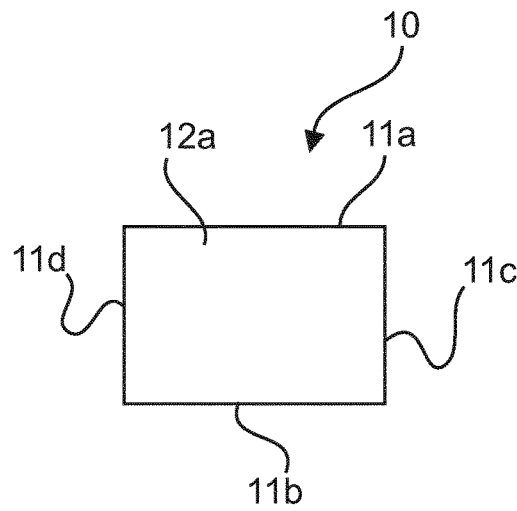
FIG. 2A shows schematically a radiation detector in a closed configuration.
Figure 2B:
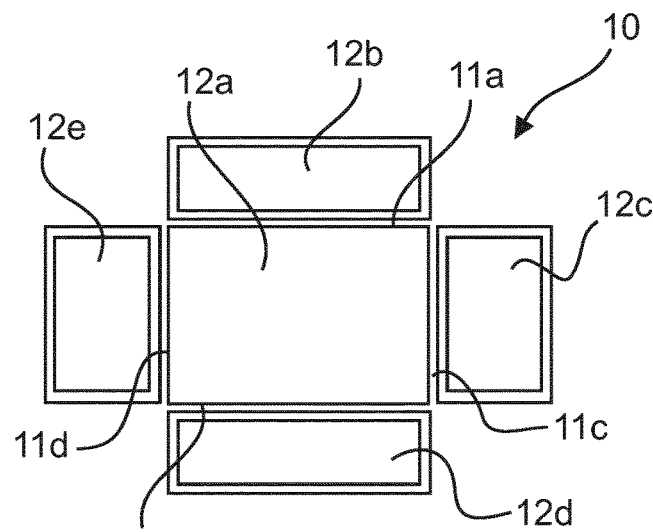
FIG. 2B shows schematically the radiation detector of FIG. 2A in a completely unfolded configuration.

FIG. 2A shows schematically a radiation detector 10 in a closed configuration. FIG. 2B shows schematically the radiation detector 10 of FIG. 2A in a completely unfolded configuration, and FIG. 2C shows schematically the radiation detector 10 of FIG. 2A in a partly unfolded configuration.

Figure 2C:
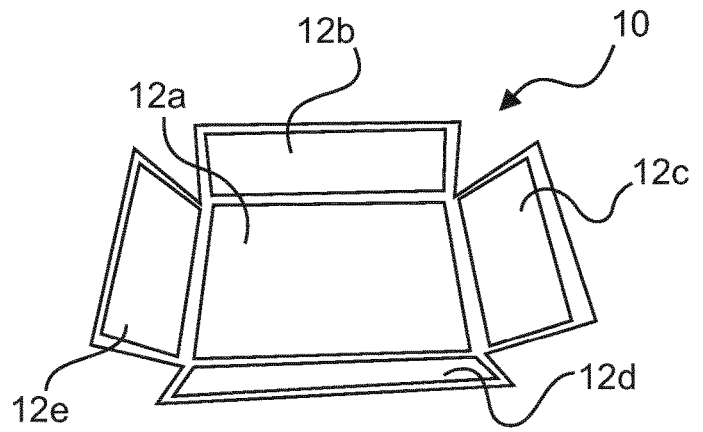
FIG. 2C shows schematically the radiation detector of FIG. 2A in a partly unfolded configuration.

If not stated otherwise, the radiation detector 10 of FIGS. 2A to 2C comprises the same features, functions and/or elements as the radiation detector 10 of FIGS. 1A and 1B.

The radiation detector 10 of FIGS. 2A to 2C comprises in total five detector units 12a, 12b, 12c, 12d and 12e, which each have a rectangular shape.

A center detector unit 12a may be larger than the other detector units 12b to 12e. By way of example, the center detector unit 12a may be an X-ray detector unit 12a and the other detector units 12b to 12e may be γ-ray detector units. Alternatively, all detector units 12a to 12e may be configured for detecting radiation particles, e.g. photons, in different energy ranges, which energy ranges may also overlap.

As shown in FIG. 2B, the detector units 12b and 12d have the same size and are arranged on two opposite sides 11a and 11b of detector unit 12a, respectively.

Similarly, the detector units 12c and 12e have the same size and are arranged on two opposite sides 11c and 11d of detector unit 12a, respectively.

As evident from FIGS. 2A to 2C, the radiation detector 10 is folded to a rather compact configuration shown in FIG. 2A and can be entirely unfolded to the configuration depicted in FIG. 2B, thereby increasing an effective detector area.

As illustrated in FIG. 2C, since each of the detector units 12b to 12e can be independently folded and/or bended, the radiation detector 10 may be used in a multitude of different geometrical configurations ranging from the completely folded configuration shown in FIG. 2A to the completely unfolded configuration shown in FIG. 2B.

Summarizing, a design of a compact foldable radiation detector 10 is provided which can be unfolded temporary to actuate a larger configuration of multiple flat detector units 12a to 12e connected to each other. The detector units 12a to 12e can be flexibly positioned at any desired angle (i.e. bending angle 50 as shown in subsequent figures) with respect to each other.

Each detector unit 12a to 12e comprises photosensitive pixels 14 at least partly covered with a specific scintillation device 20, and each detector unit 12a to 12e may be optimized for specific X-ray and/or γ-ray imaging requirements. Each detector unit 12a to 12e may have its own specific arrangement of pixels 14 and/or TFT elements 16 and/or periphery electronics 34, 36 for addressing and data signal read-out.

The basic large substrate foil 24 comprises a single thin plastic foil on which various smaller photosensitive pixels 14 are manufactured. The large substrate foil 24 may preferably be produced in one process flow using TFT backplane and photodiode manufacturing processes.

A multi-functional radiation detector 10 is realized by designing its detector units 12a to 12e so that they are enabled to operate individually and acquire images from different radiation exposures. Images of the detector units 12a to 12e can be acquired simultaneously and/or sequentially. They can be processed, merged and/or reconstructed to generate anatomical and/or functional information.

Figure 3:
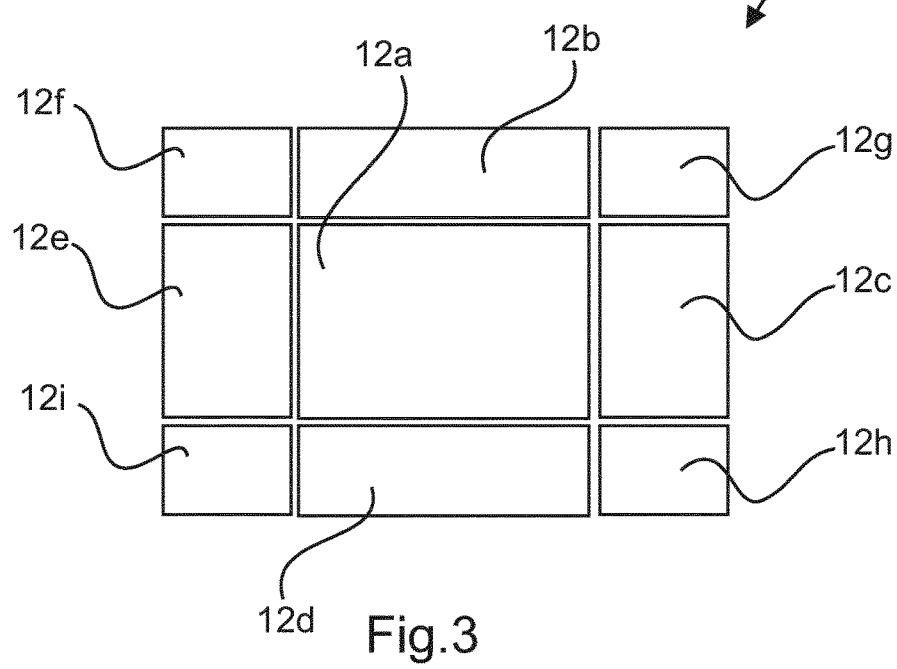
FIGS. 3 to 7 each show schematically a top view of a radiation detector in a specific design.

FIG. 3 shows schematically a top view of a radiation detector 10 according to an exemplary embodiment. If not stated otherwise, the radiation detector 10 of FIG. 3 comprises the same features, functions and/or elements as the radiation detectors 10 shown in previous figures.

The radiation detector of FIG. 3 comprises in total nine detector units 12a to 12i. Therein, the detector units 12a to 12e correspond to the detector units 12a to 12e of FIGS. 2A to 2C.

Additionally, small-size detector units 12f, 12g, 12h, 12i are arranged at each corner of the center detector unit 12a, which provides an even larger overall detection area to the radiation detector 10.

Figure 4:
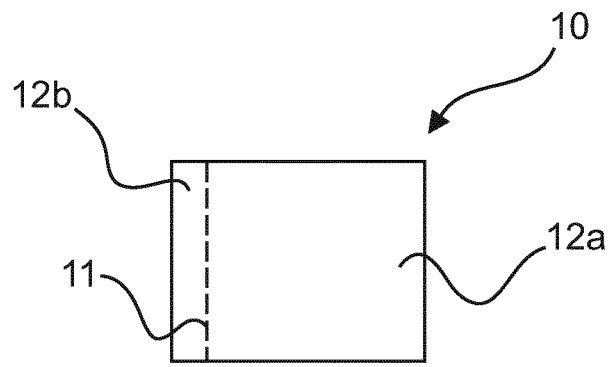

FIG. 4 shows schematically a top view of a radiation detector 10 according to an exemplary embodiment. If not stated otherwise, the radiation detector 10 of FIG. 4 comprises the same features, functions and/or elements as the radiation detectors 10 shown in previous figures.

The radiation detector 10 of FIG. 4 comprises in total two detector units 12a, 12b, which are arranged next to each other and differ in size. Detector unit 12a may be considered the main detector unit, which is bordered on an edge 11 by detector unit 12b.

Figure 5:
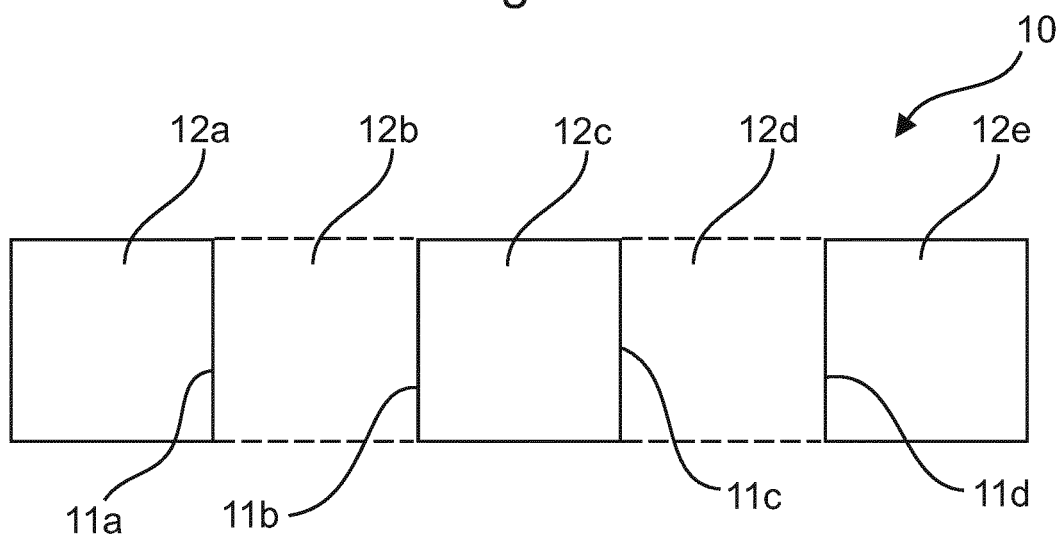

FIG. 5 shows schematically a top view of a radiation detector 10 according to an exemplary embodiment. If not stated otherwise, the radiation detector 10 of FIG. 5 comprises the same features, functions and/or elements as the radiation detectors 10 shown in previous figures.

The radiation detector 10 of FIG. 5 comprises in total five detector units 12a to 12e. Along each side and/or edge 11a to 11d of a respective detector unit 12a to 12e, the detector units 12a to 12e may be folded allowing a multitude of various geometrical configurations. All detector units 12a to 12e have a square shape and have the same size. Thus, a detector area may be increased by a factor of five from a completely folded configuration to a completely unfolded configuration.

Figure 6:
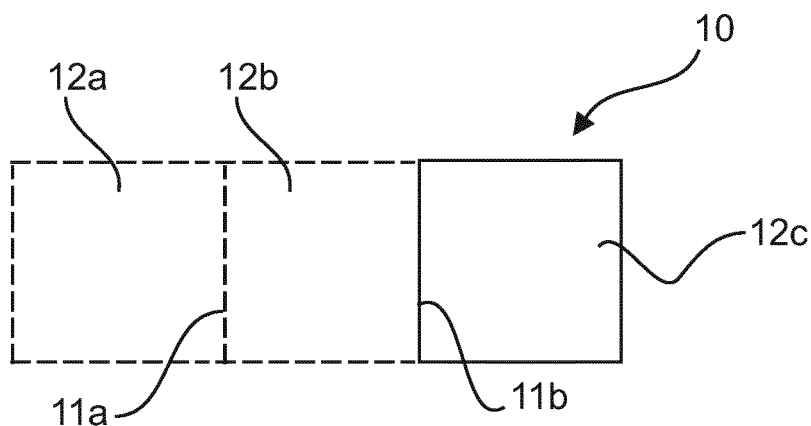

FIG. 6 shows schematically a top view of a radiation detector 10 according to an exemplary embodiment. If not stated otherwise, the radiation detector 10 of FIG. 6 comprises the same features, functions and/or elements as the radiation detectors 10 shown in previous figures.

The radiation detector 10 of FIG. 6 comprises in total three detector units 12a to 12c. Along each side and/or edge 11a to 11b of a respective detector unit 12a to 12c, the detector units 12a to 12c may be folded allowing a multitude of various geometrical configurations. All detector units 12a to 12c have a square shape and have the same size. Thus, a detector area may be increased by a factor of three from a completely folded configuration to a completely unfolded configuration.

Figure 7:
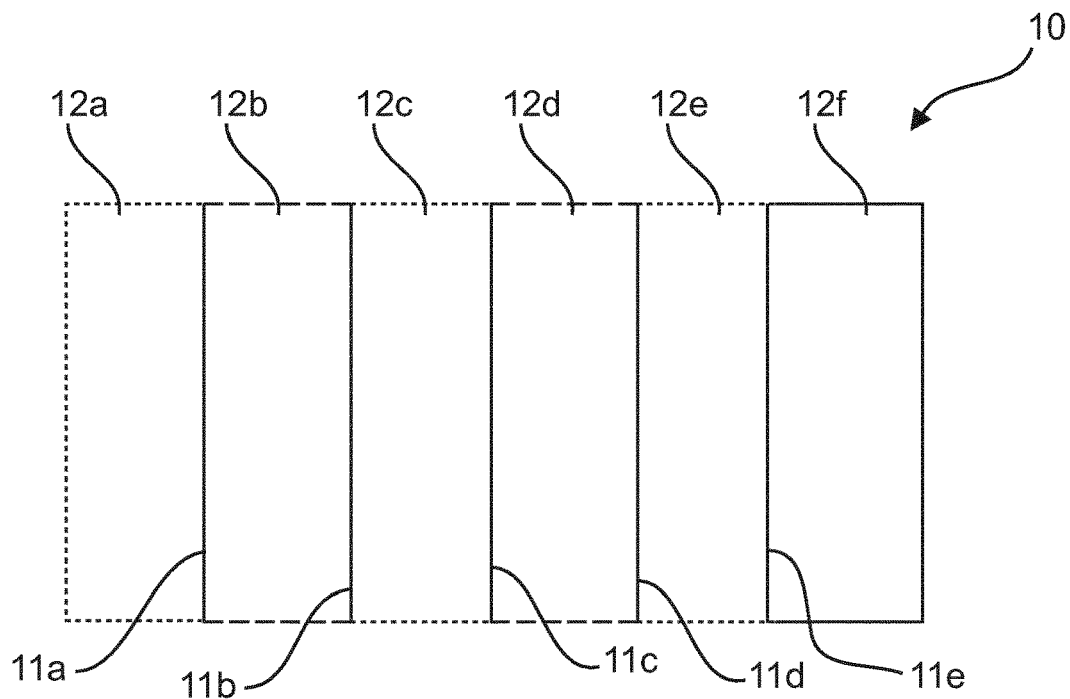

FIG. 7 shows schematically a top view of a radiation detector 10 according to an exemplary embodiment. If not stated otherwise, the radiation detector 10 of FIG. 7 comprises the same features, functions and/or elements as the radiation detectors 10 shown in previous figures.

The radiation detector 10 of FIG. 7 comprises in total six detector units 12a to 12f. Along each side and/or edge 11a to 11e of a respective detector unit 12a to 12f, the detector units 12a to 12f may be folded allowing a multitude of various geometrical configurations. All detector units 12a to 12f have a rectangular shape and have the same size. Thus, a detector area may be increased by a factor of six from a completely folded configuration to a completely unfolded configuration.

Figure 8A:
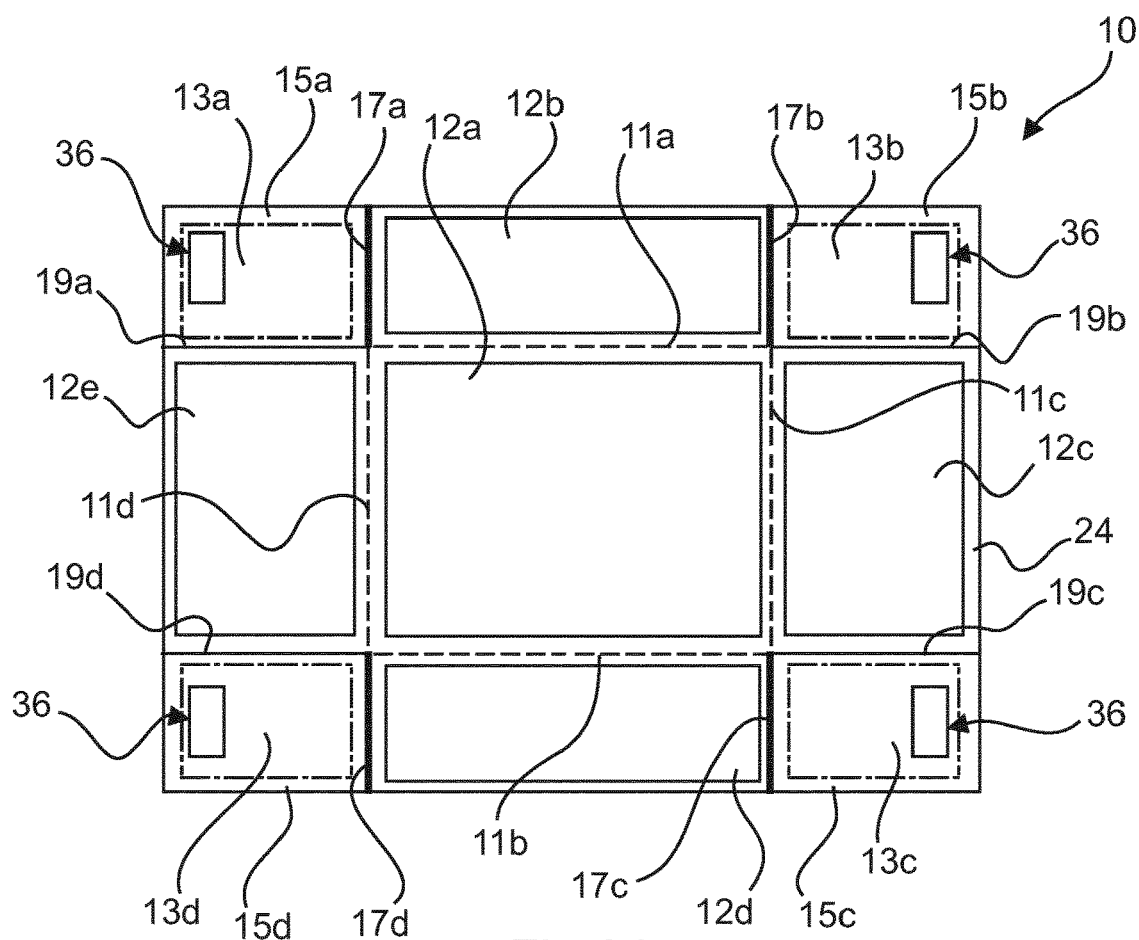
FIG. 8A shows schematically a top view of a radiation detector in a completely unfolded configuration.
Figure 8B:
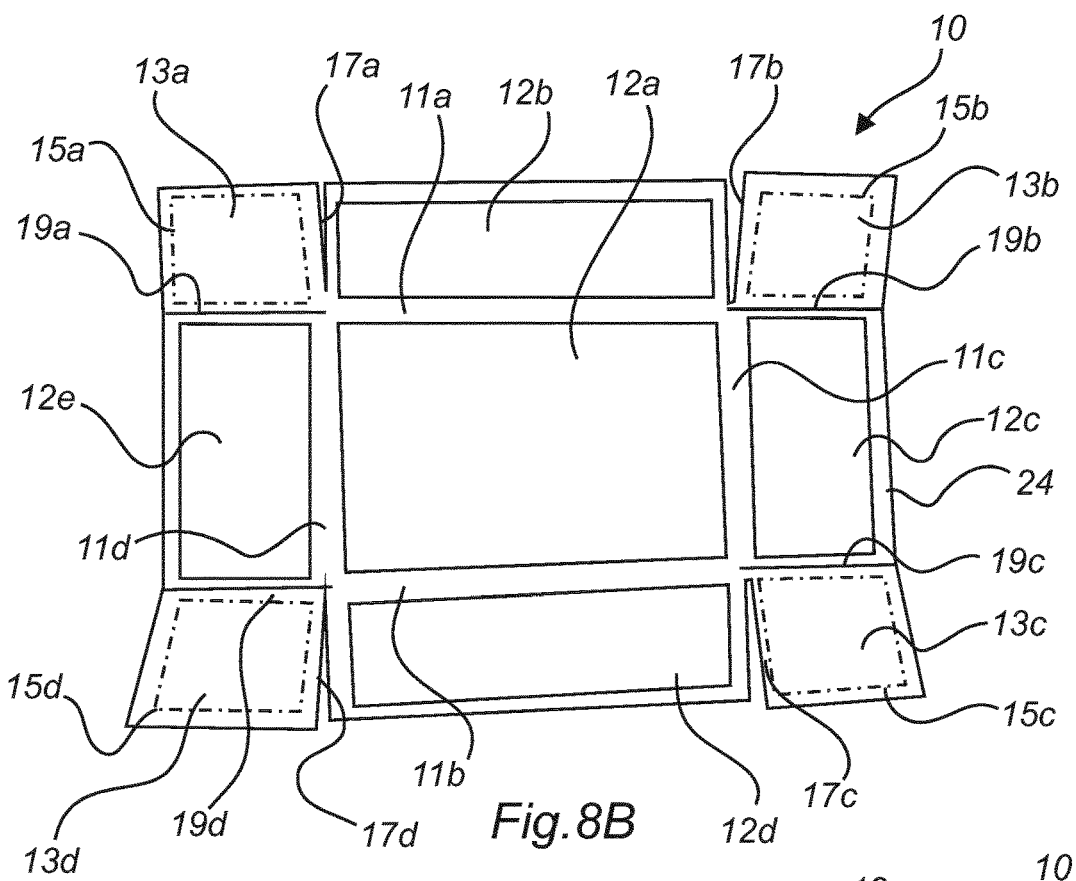
FIG. 8B shows schematically the radiation detector of FIG. 8A in a partly unfolded configuration.

FIG. 8A shows schematically a top view of a radiation detector 10 in a completely unfolded configuration, and FIG. 8B shows schematically the radiation detector 10 of FIG. 8A in a partly unfolded configuration. If not stated otherwise, the radiation detector 10 of FIGS. 8A and 8B comprises the same features, functions and/or elements as the radiation detectors 10 shown in previous figures.

The radiation detector 10 comprises in total five detector units 12a to 12e, corresponding to the detector units 12a to 12e of FIGS. 2A and 2B.

Further, the radiation detector 10 comprises in total four separate electronics units 13a to 13d, wherein at each corner of the center detector unit 12a one of those electronics units 13a to 13d is arranged. Each of the electronics units 13a to 13d comprise a separate signal read-out circuit 36. Each of those separate signal read-out circuits 36 is arranged on a separate electronics carrying region 15a to 15d of the substrate foil 24.

In order to provide foldability of each of the detector units 12b to 12e along each of edges 11a to 11d (corresponding to sides 11a to 11d of detector unit 12a), between each of the electronics units 13a to 13d and at least one directly adjoining and/or neighboring detector unit 12b to 12e, the substrate foil 24 comprises a cut 17a to 17d and/or 19a to 19d.

By way of example, for electronics units 13a, 13b cuts 17a, 17b are present in the substrate foil 24, as illustrated in FIG. 8B. Alternatively or additionally cuts 19a, 19b may be present. The same applies to the other electronics units 13c, 13d as well as cuts 17c, 17d and/or 19c, 19d, respectively.

However, in order to increase stability, it may be feasible to either provide cuts 17a to 17d or 19a to 19d.

It is to be noted that dashed lines in FIG. 8A depict foldable substrate foil 24 edges, and solid lines depict cuts 17a to 17d and 19a to 19d, which may be cut foil edges.

Empty strip areas and/or areas between various detector units 12a to 12e and or electronics units 13a to 13d may also be used for electronics, such as e.g. wiring or the like.

Figure 9A:
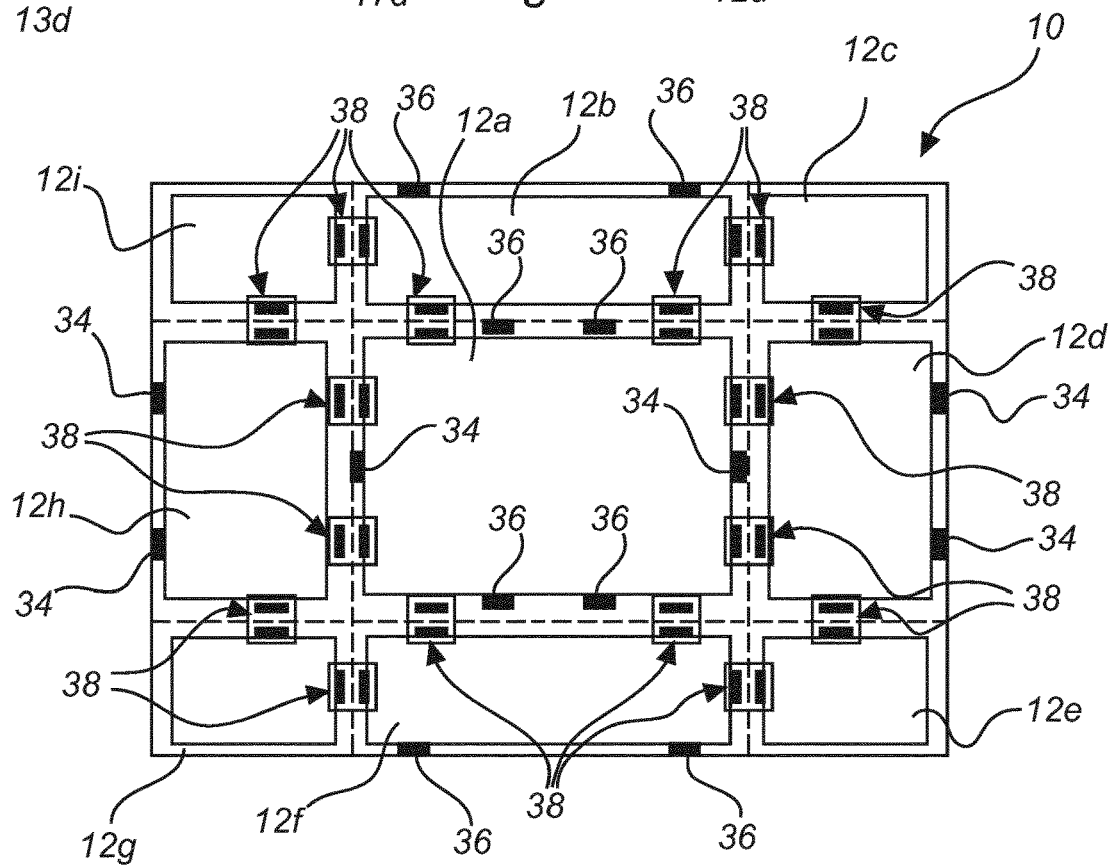
FIG. 9A shows schematically a top view of a radiation detector.
Figure 9B:
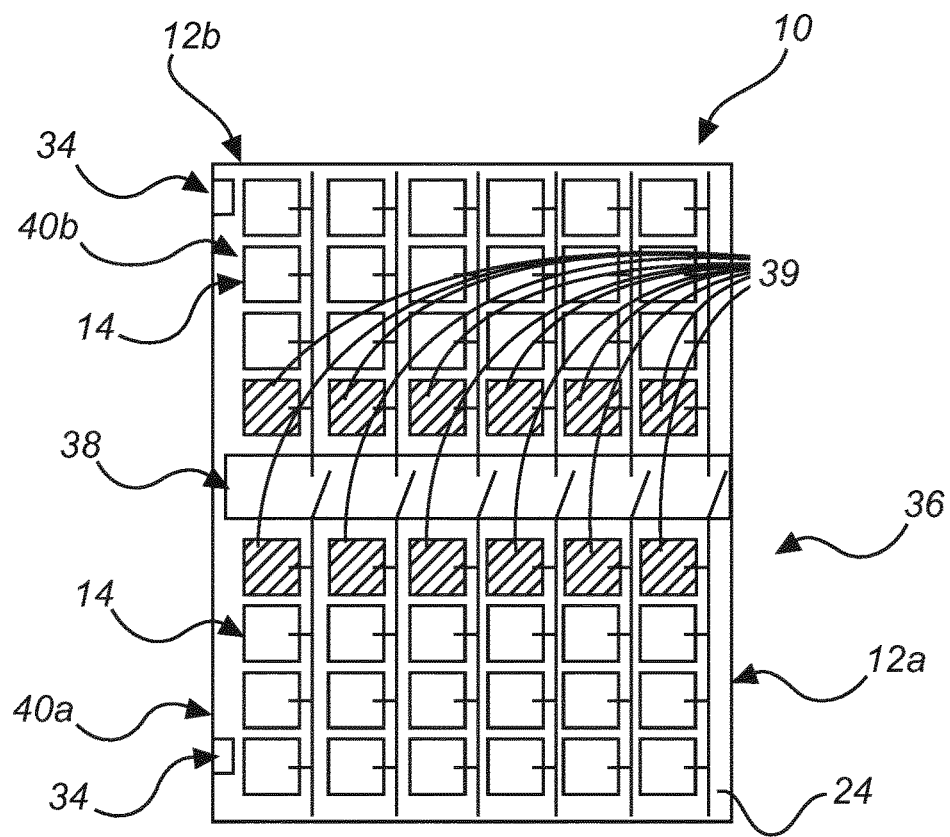
FIG. 9B shows schematically a detailed view of a part of the radiation detector of FIG. 9A.

FIG. 9A shows schematically a top view of a radiation detector 10, and FIG. 9B shows schematically a detailed view of a part of the radiation detector 10 of FIG. 9A. If not stated otherwise, the radiation detector 10 of FIG. 9A and FIG. 9B comprises the same features, functions and/or elements as the radiation detectors 10 of previous figures.

The radiation detector 10 of FIG. 9A comprises in total nine detector units 12a to 12i, similarly to the radiation detector 10 shown in FIG. 3.

Further, each detector unit 12a to 12i comprises one or more addressing circuits 34 and one or more signal read-out circuits 36.

Detector unit 12a, units 12b, 12d, 12f, 12h as well as 12c, 12e, 12g, 12i may have different pixel size, scintillation devices, addressing circuits 34 and/or signal read-out circuits 36 optimized for low or high dose, low or high kV, low or high resolution applications, as previously described.

Each of the detector units 12a to 12i is interconnected to one of the neighboring detector units 12a to 12i via at least one switch element 38, such as a global data line switch. The switch elements 38 are configured for switchably interconnecting and/or decoupling neighboring detector units 12a to 12i. More specifically, the switch elements 38 may switchably interconnect row addressing lines or column read-out data lines from neighboring detector units 12a to 12i. FIG. 9B shows, by way of example, the interconnection of column read-out lines of detector units 12a and 12b. Each of the detector units 12a to 12i comprises an array 40a, 40b of photosensitive pixels 14 which are arranged in several rows and columns on the substrate foil 24. For clarity reasons the arrays 40a, 40b only comprise three rows and six columns. However, each of the arrays 40a, 40b may comprise as much as 1000 times 1000 pixels 14 or even more.

The arrays 40a, 40b can be interconnected and/or decoupled from each other by means of the switch element 38, which may be a global data line switch and comprise e.g. one TFT element per column for interconnecting/decoupling each column.

The addressing circuits 34 may each comprise an IC as row driver, which addresses multiple rows and/or gate lines of the respective array 40a, 40b of photosensitive pixels 14.

The signal read-out circuits 36 may comprise an IC or ASIC for reading out signals from each column. Further, the read-out circuits 36 may comprise a charge sensitive amplifiers (CSA) 39.

To summarize, detector units 12a to 12i can be decoupled electronically from each other by inserting switch elements 38 in data read-out lines and row driver lines. This enables individual, autonomous operation of each detector units 12a to 12i, avoids crosstalk between detector units 12a to 12i and reduces excessive noise caused by too long data lines Further, CSAs 39 may comprise bondpads for signal read-out of ICs of the signal read-out circuits 36. For simplicity, TFT elements 16, row driver lines, driver IC's, and pixel circuits are not shown in FIGS. 9A and 9B.

Optionally, ICs can be placed on the substrate foil 24 backside using through-foil-via technology.

Figure 10:
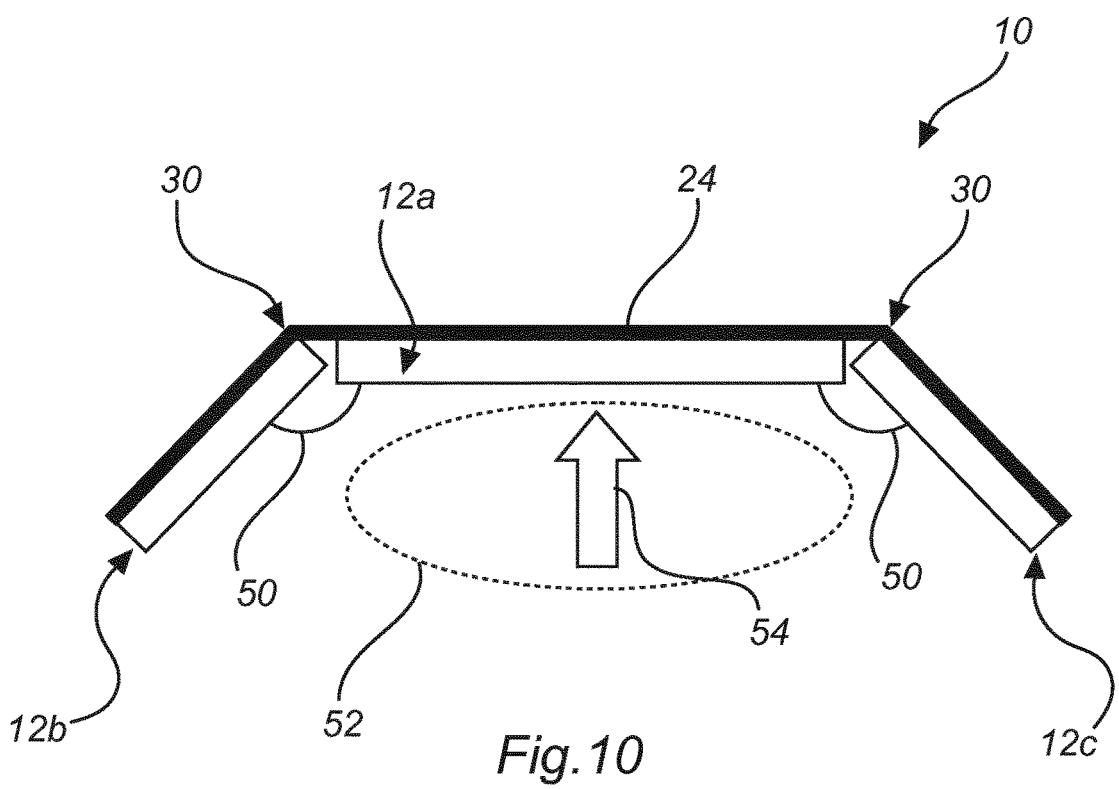
FIGS. 10 to 18 each show schematically a cross-sectional view of a radiation detector in a different geometrical set-up.

FIG. 10 shows schematically a cross-sectional view of a radiation detector 10 according to an exemplary embodiment. If not stated otherwise, the radiation detector 10 of FIG. 10 comprises the same features, functions and/or elements as the radiation detectors 10 of previous figures.

The radiation detector 10 comprises three detector units 12a to 12c. At each bending region 30 between detector units 12b and 12a as well as 12a and 12c, the radiation detector is bended by a bending angle 50 of about 60°. Therein, the bending angle 50 is the angle enclosed by two directly neighboring detector units 12b, 12a and 12a, 12c, respectively.

As described in previous figures, the detector units 12a to 12c may be sensitive to radiation of various energies. E.g. detector unit 12a may be an X-ray detector unit and detector units 12b and 12c may be γ-ray detector units.

An impinging direction of photon radiation is indicated in FIG. 10 by the arrow 54, and e.g. a patient position is indicated by object 52. Photons passing through the object 52 are partly absorbed and by means of the detector units 12a to 12c a comprehensive radiation image may be acquired, wherein the detector units 12a to 12c may be positioned according to a geometry of the patient and/or object 52.

Figure 11:
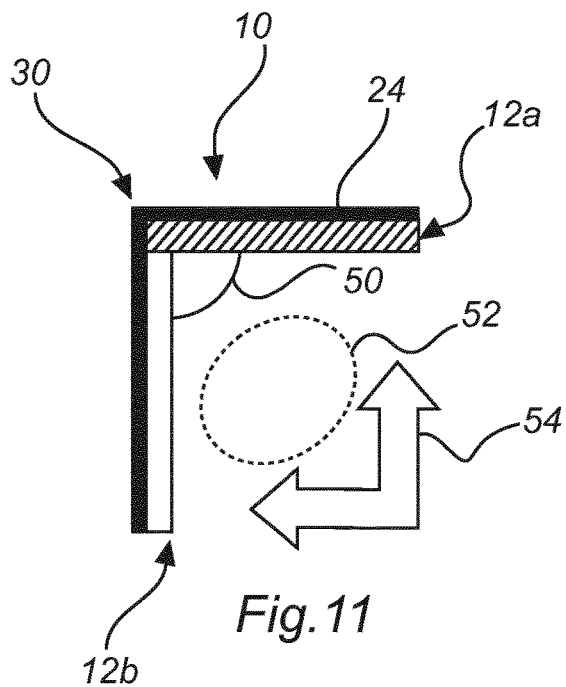

FIG. 11 shows schematically a cross-sectional view of a radiation detector 10 according to an exemplary embodiment. If not stated otherwise, the radiation detector 10 of FIG. 11 comprises the same features, functions and/or elements as the radiation detectors 10 of previous figures.

The radiation detector 10 of FIG. 11 comprises two detector units 12a, 12b arranged in a bending angle 50 of 90°. Photon radiation may impinge perpendicularly onto each of the detector units 12a, 12b after passing through object 52, as indicated by the double-arrow 54. Again, the detector units 12a, 12b may be sensitive to photons of different energies.

Figure 12:
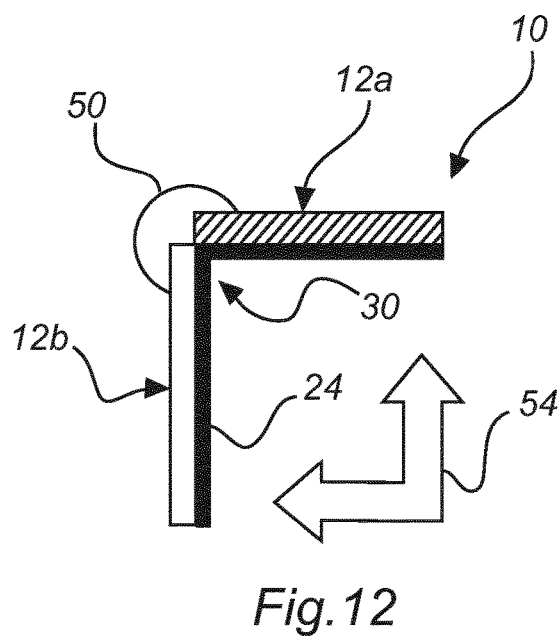

FIG. 12 shows schematically a cross-sectional view of a radiation detector 10 according to an exemplary embodiment. If not stated otherwise, the radiation detector 10 of FIG. 12 comprises the same features, functions and/or elements as the radiation detectors 10 of previous figures.

The radiation detector 10 of FIG. 12 comprises two detector units 12a, 12b arranged in a bending angle 50 of 270°. In contrast to the embodiment of FIG. 11 photon radiation may impinge perpendicularly onto each of the detector units 12a, 12b after passing through substrate foil 24, as indicated by the double-arrow 54. Again, the detector units 12a, 12b may be sensitive to photons of different energies.

Figure 13:
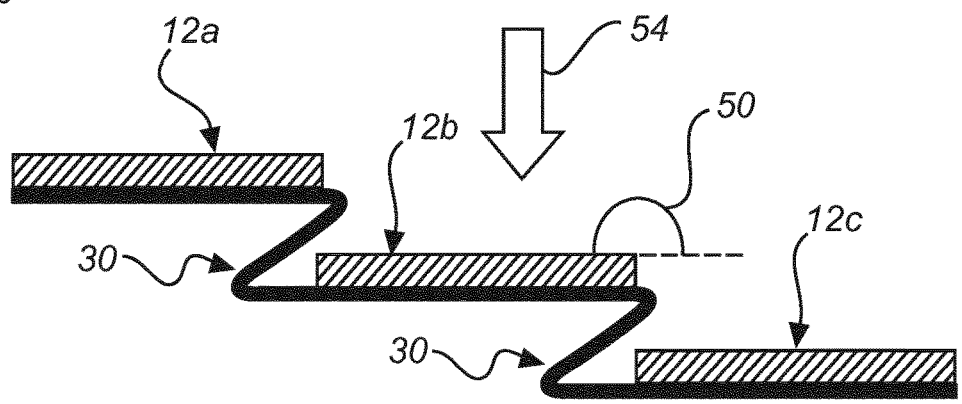

FIG. 13 shows schematically a cross-sectional view of a radiation detector 10 according to an exemplary embodiment. If not stated otherwise, the radiation detector 10 of FIG. 13 comprises the same features, functions and/or elements as the radiation detectors 10 of previous figures.

The radiation detector 10 of FIG. 13 comprises three detector units 12a, 12b, 12c arranged in a bending angle 50 of 180°. Due to the high flexibility of the substrate foil 24, the detector units 12a to 12c can be arranged in a step-like structure, such that each of the detector units 12a to 12c may only have a slightly different distance to an object to be irradiated. Ideally, distance differences should be as small as possible, as they lead to differences in image magnifications for each detector unit 12a, 12b, 12c. However, these can be corrected by image post-processing. Further as can be seen, the substrate foil 24 may be arranged in a Z-like structure in each of the bending regions 30 providing a high degree in flexibility of the radiation detector 10.

Figure 14:
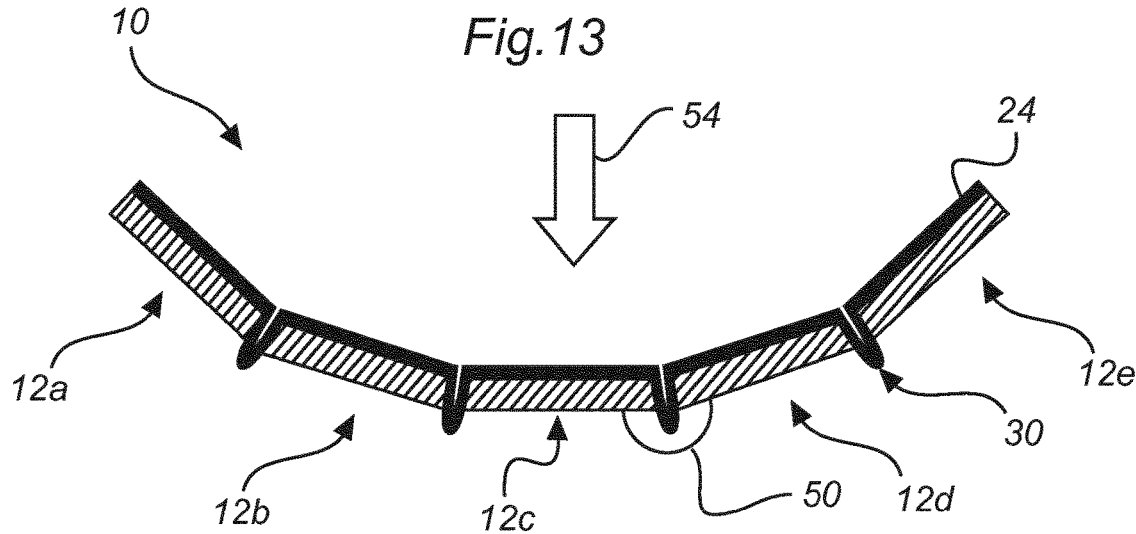

FIG. 14 shows schematically a cross-sectional view of a radiation detector 10 according to an exemplary embodiment. If not stated otherwise, the radiation detector 10 of FIG. 14 comprises the same features, functions and/or elements as the radiation detectors 10 of previous figures.

The radiation detector 10 comprises in total five detector units 12a to 12e arranged in an arc-like and/or circular geometry. Each of the detector units 12a to 12e has a flat geometry. Radiation may first pass through the substrate foil 24 and then onto the detector units 12a to 12e as depicted by arrow 54. However, any other impinging direction 54 is possible.

As shown, due to the high flexibility of the substrate foil 24 in the bending regions 30, the substrate foil 24 may be folded to a loop-like structure allowing to bring neighboring detector units 12a to 12e closely together for image acquisition.

Figure 15:
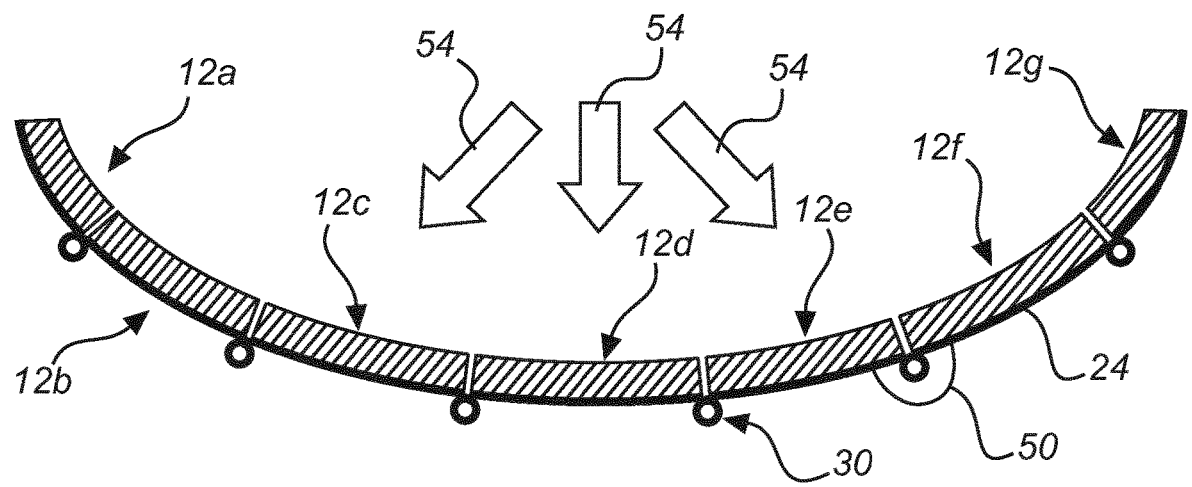

FIG. 15 shows schematically a cross-sectional view of a radiation detector 10 according to an exemplary embodiment. If not stated otherwise, the radiation detector 10 of FIG. 15 comprises the same features, functions and/or elements as the radiation detectors 10 of previous figures.

The radiation detector 10 comprises in total seven detector units 12a to 12g arranged in an arc-like and/or circular geometry. Each of the detector units 12a to 12g has a curved shape and/or a curved outer geometry and/or a curved outer surface. Due to the flexibility of the substrate foil 24 also the substrate foil 24 has a curved shape in regions, where the detector units 12a to 12g are arranged.

The detector units 12a to 12g may be curved in only one spatial direction or dimension, respectively. Alternatively, the detector units 12a to 12g or a part thereof may be curved in two spatial directions, e.g. orthogonal spatial directions, wherein radii of the respective curvatures in both directions may be equal or differ from another. Further, the radiation detector 10 may also comprise a combination of flat detector units 12a to 12g, as shown in FIG. 14, and curved detector units 12a to 12g, as shown in FIG. 15.

Radiation may first pass through the detector units 12a to 12g and then onto the substrate foil 24 as depicted by arrows 54. However, any other impinging direction 54 is possible.

As shown, due to the high flexibility of the substrate foil 24 in the bending regions 30, the substrate foil 24 may be folded to a loop-like structure allowing to bring neighboring detector units 12a to 12g closely together for image acquisition.

Figure 16:
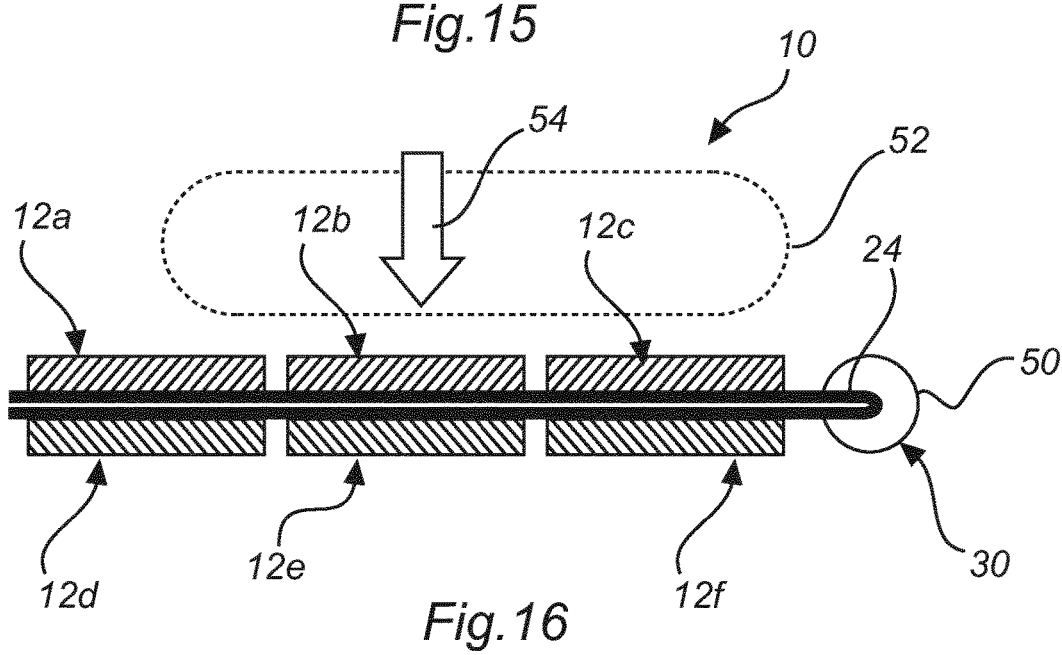

FIG. 16 shows schematically a cross-sectional view of a radiation detector 10 according to an exemplary embodiment. If not stated otherwise, the radiation detector 10 of FIG. 16 comprises the same features, functions and/or elements as the radiation detectors 10 of previous figures.

The radiation detector 10 comprises in total six detector units 12a to 12f, wherein the detector 10 is folded in the middle of detector 10 in the bending region 30 such that pairs of detector units (12a, 12d; 12b, 12e and 12c, 12f) are arranged back-to-back. E.g. detector units 12a to 12c and detector units 12d to 12f may be sensitive to different radiation energies, for instance for dual energy X-ray imaging applications. The bending angle 50 in FIG. 16 is about 360°.

For dual energy X-ray imaging the detector units 12a to 12c, which are first hit by radiation may have a thinner scintillation device 20 and/or scintillation layer 22 than the detector units 12d to 12f, which are arranged behind the detector units 12a to 12c with respect to the impinging direction 54. This way, detector units 12a to 12c may be more sensitive to low-energy X-rays and detector units 12d to 12f may be more sensitive to high-energy X-rays. Further, detector units 12a to 12c may comprise a different scintillation material than detector units 12d to 12f. Moreover, in order to shield light and/or electromagnetic signals from the scintillation devices 20 of the detector units 12a to 12c and avoid so-called cross-talk, the radiation detector 10 may further comprise one or a plurality of light shields (not shown) arranged on the substrate foil 24.

Figure 17:
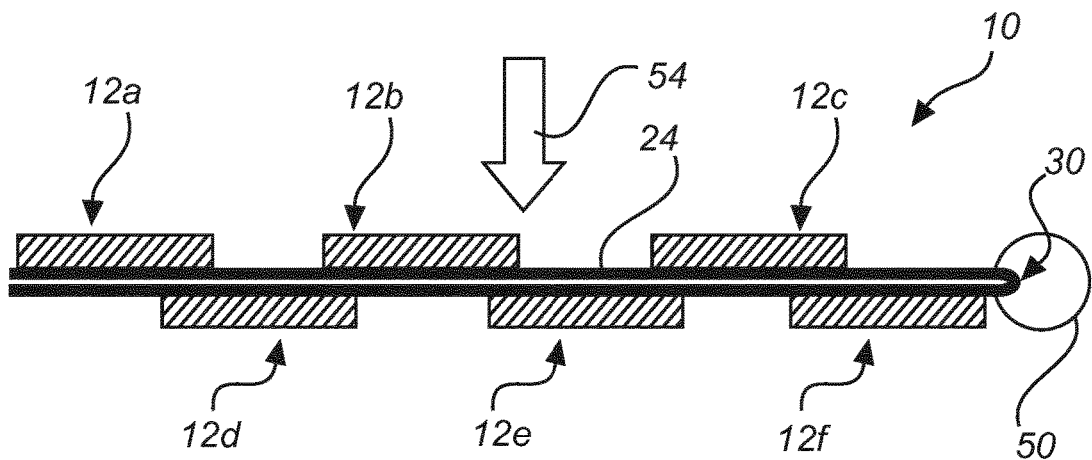

FIG. 17 shows schematically a cross-sectional view of a radiation detector 10 according to an exemplary embodiment. If not stated otherwise, the radiation detector 10 of FIG. 17 comprises the same features, functions and/or elements as the radiation detectors 10 of previous figures.

The radiation detector 10 comprises in total six detector units 12a to 12f, wherein the detector 10 is folded in the middle of detector 10 in the bending region 30. In contrast to FIG. 16, the units 12a to 12f are displaced and/or offset with respect to each other, such that they partly overlap at border regions, and such that pairs of detector units (12a, 12d; 12b, 12e and 12c, 12f) are only partly arranged back-to-back. The configuration of the radiation detector 10 shown in FIG. 17 may be particularly advantageous for very large field-of-view X-ray imaging, such as e.g. whole body imaging and/or spine imaging.

Figure 18:
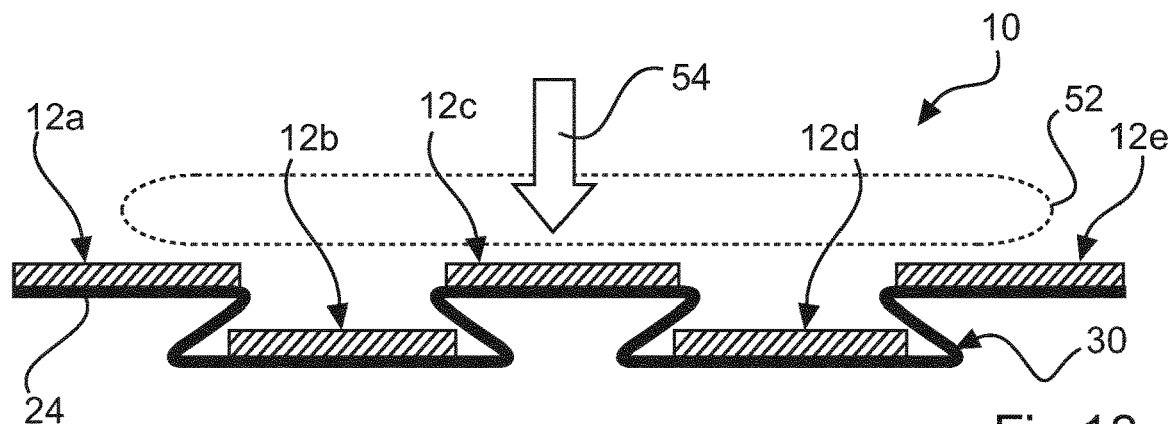

FIG. 18 shows schematically a cross-sectional view of a radiation detector 10 according to an exemplary embodiment. If not stated otherwise, the radiation detector 10 of FIG. 18 comprises the same features, functions and/or elements as the radiation detectors 10 of previous figures.

The radiation detector 10 comprises in total five detector units 12a to 12e, wherein units 12b and 12d are displaced and/or offset with respect to the other units 12a, 12c and 12e. As in FIG. 13, the substrate foil 24 is bended and/or folded to a Z-like structure in each bending region 30. The configuration of the radiation detector 10 shown in FIG. 18 may be particularly advantageous for very large field-of-view X-ray imaging, such as e.g. whole body imaging and/or spine imaging.

The geometrical set-ups and/or configurations shown in FIGS. 10 to 18 illustrate the multi-functionality and/multi-modality of the radiation detector 10. Applications may e.g. comprise hybrid X-ray and γ-ray imaging for SIRT (selective internal radio therapy, as e.g. illustrated in FIG. 10), biplane X-ray imaging in IGT (image guided therapy, as e.g. illustrated in FIGS. 11 and 12), Digital Radiology (DR, as e.g. illustrated in FIGS. 13, 17 and 18, Dual-energy DR, as e.g. illustrated in FIG. 16), Computed Tomography (CT) imaging (as e.g. illustrated in FIGS. 14 and 15), Tomosynthesis, Neonatal and/or pediatric imaging (L-shape), wherein no movement of patient may be required for different views, mobile DR applications using a compact portable detector 10, whole-body imaging, trauma, orthopedics and many others.

Figure 19A:
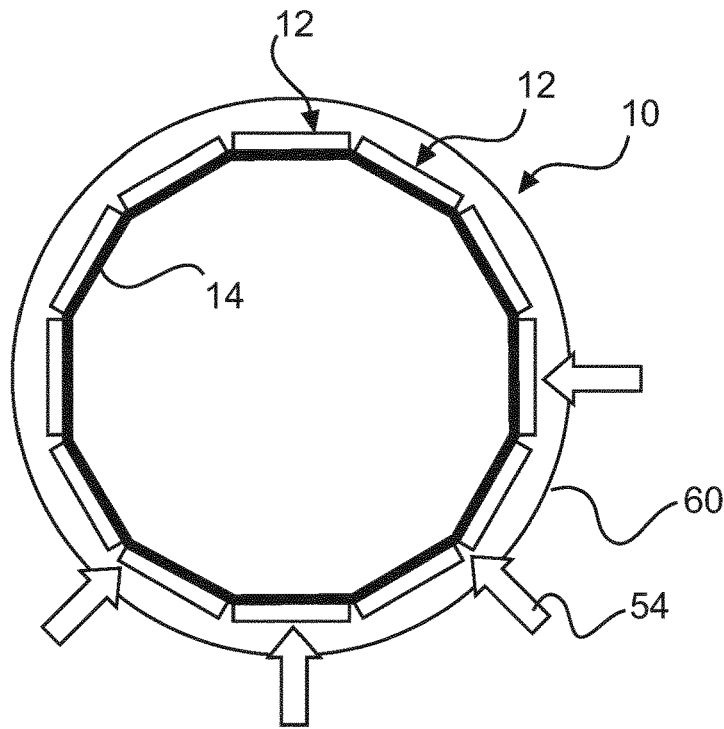
FIG. 19A shows schematically a cross-sectional view of a radiation detector.
Figure 19B:
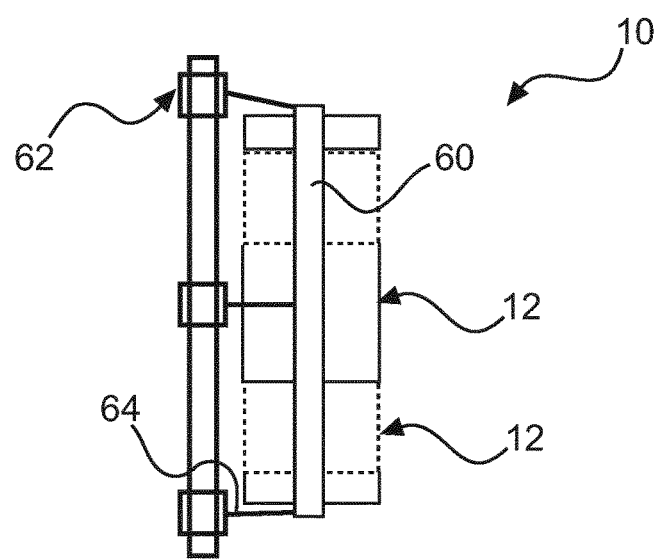
FIG. 19B shows schematically a side view of the radiation detector of FIG. 19A.

FIG. 19A shows schematically a cross-sectional view of a radiation detector 10, and FIG. 19B shows schematically a side view of the radiation detector 10 of FIG. 19A.

If not stated otherwise, the radiation detector 10 of FIGS. 19A and 19B comprises the same features, functions and/or elements as the radiation detectors 10 of previous figures.

In FIGS. 19A and 19B, a CT-like ring is formed by means of the radiation detector 10 comprising in total twelve detector units 12, which are arranged in a ring-structure. The radiation detector 10 comprises a support ring 60 for holding the detector units 12 in the ring-structure. The support ring 60 may be positioned by means of tube elements 62 attached via further tube elements 64 to the support ring.

An alternative configuration and/or embodiment would be a half ring.

Further, an adjustable bore size is possible by folding one or more detector units 12 away to the outside of the ring-structure.

Moreover, the detector units 12 of the radiation detector 10 shown FIGS. 19A and 19B may also have a curved shaped, as illustrated in FIG. 15.

Figure 20A:
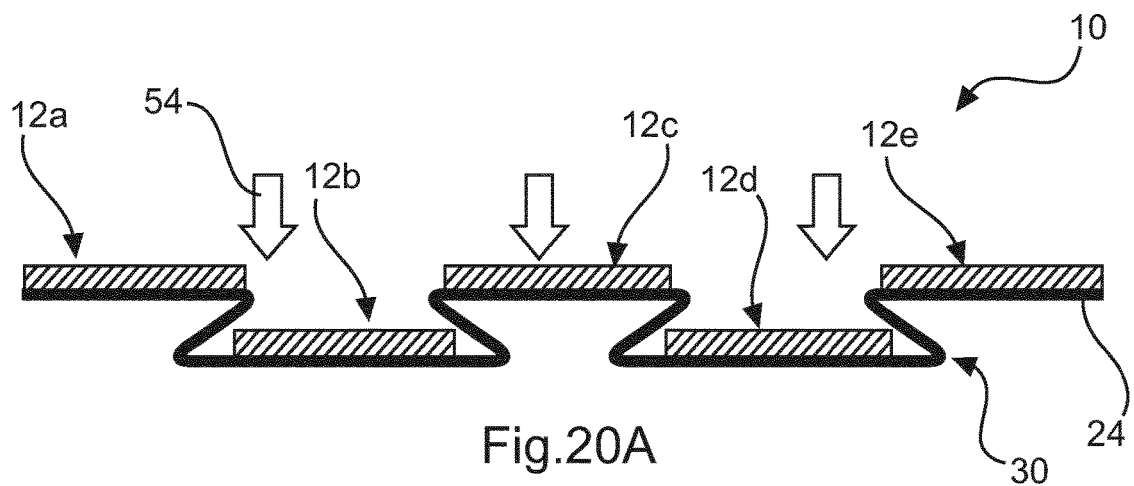
FIG. 20A shows schematically a cross-sectional view of a radiation detector.

FIG. 20A shows schematically a cross-sectional view of a radiation detector 10, FIGS. 20B and 20C each show schematically a detailed view of a part of the radiation detector 10 of 20A according to different embodiments, as explained in the following.

Figure 20B:
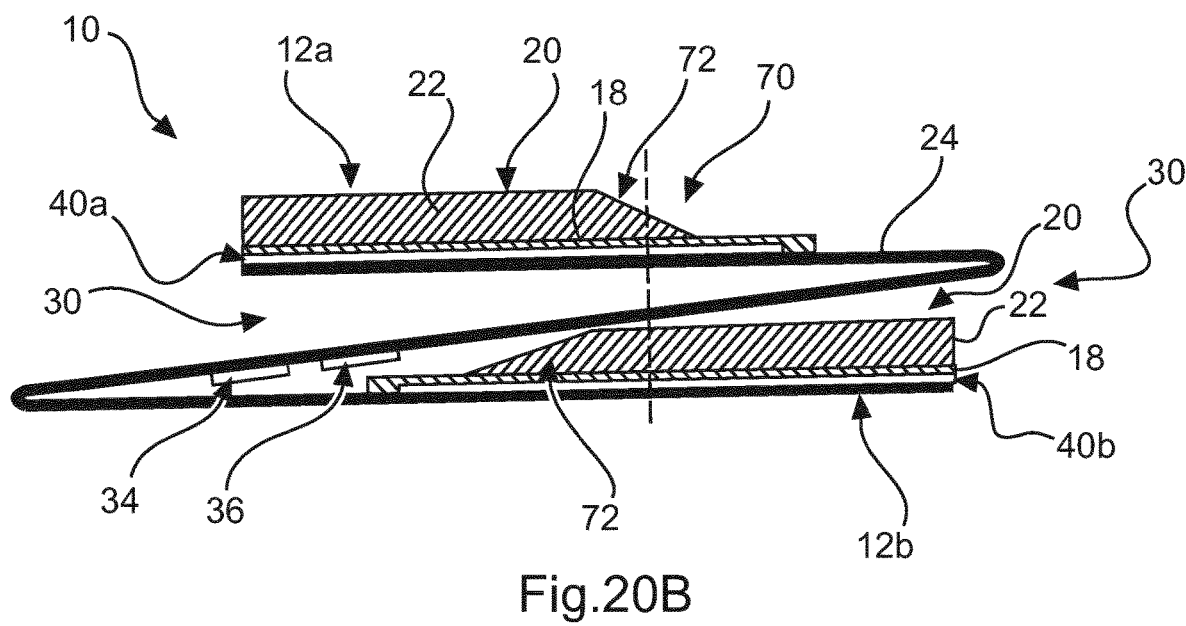
FIGS. 20B and 20C each show schematically a detailed view of a part of the radiation detector of FIG. 20A according to different embodiments.
Figure 20C:
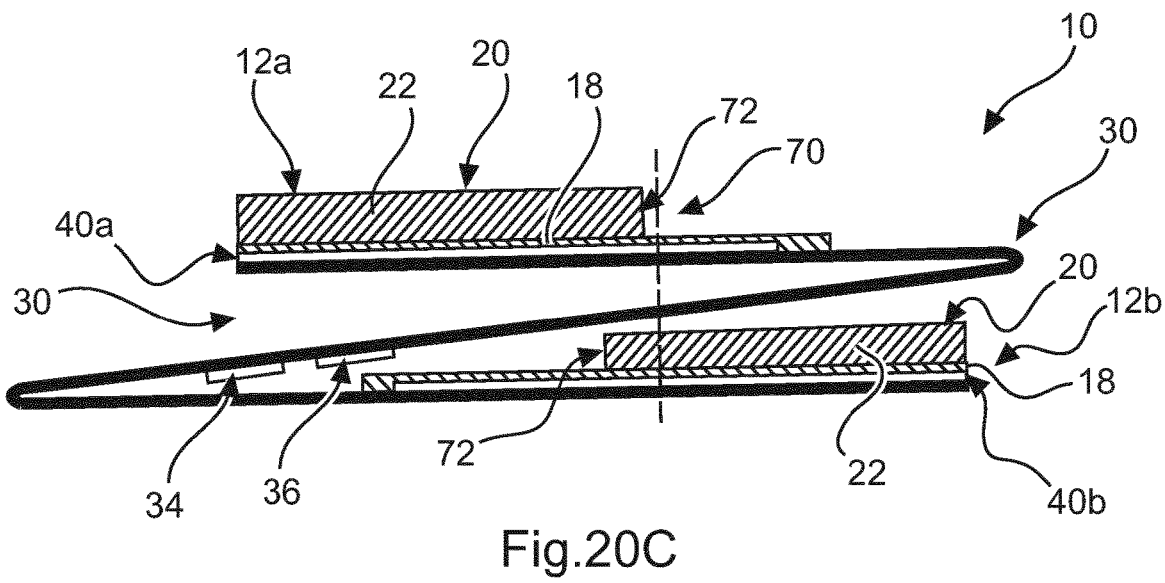

If not stated otherwise, the radiation detector 10 of FIGS. 20A to 20C comprise the same features, functions and/or elements as the radiation detectors 10 of previous figures.

Similarly, to the configuration shown in FIG. 18, the radiation detector 10 of FIG. 20A comprises in total five detector units 12a to 12e, wherein units 12b and 12d are displaced and/or offset with respect to the remaining units 12a, 12c and 12e. The substrate foil 24 is bended and/or folded to a Z-like structure in each bending region 30.

FIG. 20B shows a detailed view of detector units 12a and 12b. Each of the units 12a, 12b comprises a scintillation device 20 with scintillation layer 22 arranged on a photo-diode 18 and an array 40a, 40b of photosensitive pixels 14. Further, the addressing circuit 34 and the signal read-out circuit 36 are depicted, which are arranged in the bending region 30 of the substrate foil 24.

As can be seen in FIG. 20B, the substrate foil 24 at the edge 70 of the detector unit 12a is partly overlapping with the detector unit 12b. However, since the substrate foil is rather thin, its X-ray absorbance may be neglected.

In order to provide seamless X-ray detection, the edges 72 of the scintillation devices 20 of detector units 12a, 12b are tapered.

Main criterion for seamless X-ray imaging may be that the photosensitive pixel array 40a of the top detector unit 12a overlaps with the photosensitive pixel array 40b of the bottom detector unit 12b and that in the overlap region at least one of them may be covered with scintillation layer 22 and/or scintillation material. X-ray images of both detector units 12a, 12b can seamlessly be stitched to each other by advanced image processing techniques.

Referring to FIG. 20B, in contrast to the tapered edges 72 of the scintillation devices 20 shown in FIG. 20B, the edges 72 of the scintillation devices 20 of the detector units 12a, 12b shown in FIG. 20C are sharp. A sharp scintillator edge 72 may be preferred above a tapered scintillator edge as the overlap region is smaller and potential image distortions caused by scintillator thickness variations are reduced.

For the sake of completeness, it is to be noted that each of the units 12a, 12b shown in FIG. 20B comprises a scintillation device 20 with scintillation layer 22 arranged on a photodiode 18 and an array 40a, 40b of photosensitive pixels 14. Further, the addressing circuit 34 and the signal read-out circuit 36 are depicted, which are arranged in the bending region 30 of the substrate foil 24

Figure 21:
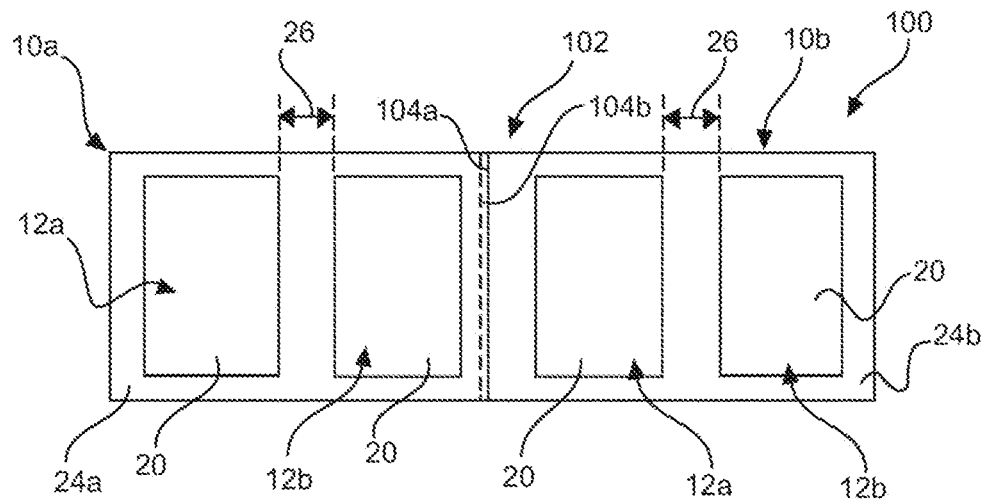
FIG. 21 shows schematically a top view of a radiation detector arrangement.

FIG. 21 shows schematically a top view of a radiation detector arrangement 100. The radiation detector arrangement 100 comprises two radiation detectors 10a, 10b as described with reference to the previous figures. If not stated otherwise, each of the radiation detectors 10a, 10b of the radiation detector arrangement 100 of FIG. 21 comprises the same features, functions and/or elements as the radiation detectors 10 of previous figures.

Particularly, each of the radiation detectors 10a, 10b comprises the same elements, features and/or functions as described in FIG. 1.

Amongst others, radiation detector 10a comprises a substrate foil 24a, on which detector units 12a, 12b are arranged in juxtaposition such that the respective scintillation devices 20 are spaced apart from each other by distance 26.

Similarly, radiation detector 10b comprises a substrate foil 24b, on which detector units 12a, 12b are arranged in juxtaposition such that the respective scintillation devices 20 are spaced apart from each other by distance 26.

The two substrate foils 24a, 24b of the radiation detectors 10a, 10b are interconnected with each other at a connecting region 102. The interconnection of the two substrate foils 24a, 24b may comprise a mechanical interconnection of the respective substrate foils 24a, 24b. Accordingly, the substrate foils 24a, 24b may be glued, welded and/or taped together. The substrate foils 24a, 24b may alternatively or additionally be interconnected by a thermofusion process, i.e. by means of a heat seal and compression. A first edge 104a of radiation detector 10a and/or of substrate foil 24a at least partly overlaps with a second edge 104b of radiation detector 10b and/or of substrate foil 24b. The first edge 104a and the second edge 104b may alternatively be arranged flush with respect to each other.

Further, the radiation detectors 10a, 10b may be electronically interconnected, e.g. by means of so-called Through-Foil-Via (TFV), wire bonding and/or by printing conductive lines, e.g. ink-based. This way, an overall size of the radiation detector arrangement 100 as well as a multi-functionality may further be increased.

This way, basically an arbitrary number of radiation detectors 10, 10a, 10b may be interconnected in alternative embodiments of the radiation detector arrangement 100.

Figure 22:
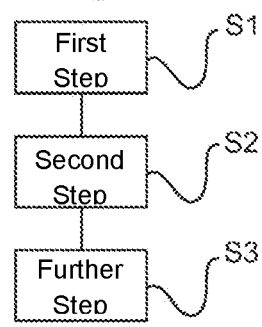
FIG. 22 shows schematically a flow chart illustrating steps of a method for producing a radiation detector.

FIG. 22 shows schematically a flow chart illustrating steps of a method for producing a radiation detector 10. If not stated otherwise, the radiation detector 10 produced according to the method comprises the same features, functions and/or elements as the radiation detectors 10 of previous figures.

In a first step S1 a substrate foil 24, particularly a single substrate foil 24, is provided and in a second step S2 a plurality of detector units 12a, 12b is provided. The detector units 12a, 12b each comprise a plurality of photosensitive pixels 14, and each comprise at least one scintillation device 20 optically coupled to the plurality of photosensitive pixels 14. Steps S1 and S2 may be performed in arbitrary sequence or simultaneously.

In a further step S3 the detector units 12a, 12b are arranged on the substrate foil 24 in juxtaposition with respect to each other, such that at least two directly adjoining scintillation devices 20 of at least two directly adjoining detector units 12a, 12b are spaced apart from each other by a gap 28, such that the radiation detector 10 is bendable along at least a part of the gap 28.

Optionally, the substrate foil 24 may be cut between the detector units 12a, 12b, i.e. the detector units 12a, 12b may be cut-out, and the detector units 12a, 12b may be laminated, e.g. by gluing and/or welding, to a further large-sized substrate foil in an arbitrary geometrical arrangement with respect to each other.

Figure 23:
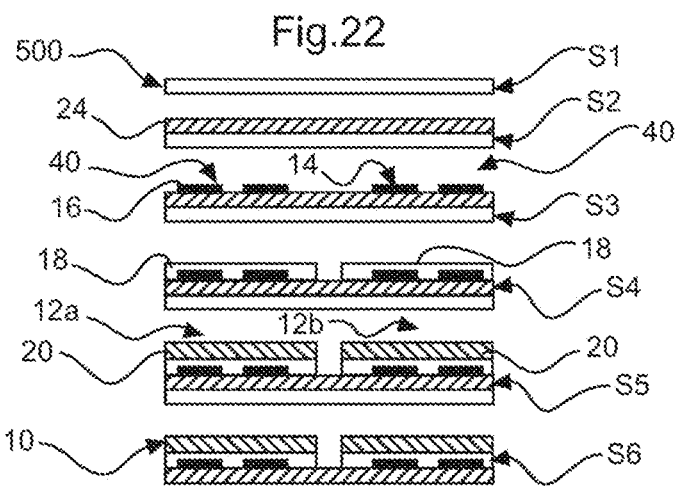
FIG. 23 schematically illustrates a method for producing a radiation detector.

FIG. 23 schematically illustrates a method for producing a radiation detector 10. FIG. 23 illustrates a detector-on-foil manufacturing process flow. If not stated otherwise, the radiation detector 10 produced according to the method comprises the same features, functions and/or elements as the radiation detectors 10 of previous figures.

In a first step S1 a glass carrier 500 is provided serving as starting substrate.

In a second step S2 a substrate foil 24 is arranged on the glass carrier 500. The substrate foil 24 may be laminated to the glass carrier 500.

In a third step S3 pixels 14 and TFT elements 16 are arranged on the substrate foil 24, e.g. in a TFT backplane fabrication process. The TFT elements 16 may be arranged in an array 40 on the substrate foil 24.

In a fourth step S4 a photodiode 18 is deposited on the pixels 14 and/or on the array 40 of pixels 14.

In a fifth step S5 a scintillator device 20 is arranged on and/or applied to the photodiodes 18. This way, as shown in the exemplary embodiment of FIG. 23, two detector units 12a and 12b are formed.

In a sixth step S6, the substrate foil 24 is delaminated and the radiation detector 10 is basically provided, which may also comprise at least one signal read-out circuit 36 and/or an addressing circuit 34, as shown in previous figures.

Optionally, in a further step electronics may be arranged on the radiation detector 10.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A radiation detector, comprising:
   a plurality of detectors, each detector comprising a plurality of photosensitive pixels and at least one scintillation device optically coupled to the plurality of photosensitive pixels;
   a substrate foil for carrying the detectors; and
   a switch arranged between two detectors of the plurality of detectors,
   wherein the detectors are arranged in juxtaposition on the substrate foil;
   wherein at least two directly adjoining scintillation devices of at least two directly adjoining detectors are spaced apart from each other, such that the radiation detector is bendable along at least a part of a bending region of the substrate foil,
   wherein the bending region is arranged between the at least two directly adjoining scintillation devices;
   wherein each detector comprises at least one of a separate addressing circuit for addressing the respective detector and a separate signal read-out circuit for reading-out signals from the respective detector; and
   wherein the switch is configured to electrically interconnect and decouple the two detectors.

2. The radiation detector according to claim 1, wherein the radiation detector is bendable with a bending angle enclosed by the at least two directly adjoining detectors; wherein the bending angle ranges from 0° to 360°.

3. The radiation detector according to claim 1, wherein the substrate foil comprises polymer material.

4. The radiation detector according to claim 1, wherein the plurality of photosensitive pixels comprises an array of photosensitive pixels; wherein each of the photosensitive pixels comprises at least one Thin-Film-Transistor element.

5. The radiation detector according to claim 1, wherein at least one of the plurality of detectors has a curved shape.

6. The radiation detector according to claim 1, wherein each separate addressing circuit and/or each separate signal read-out circuit is arranged on a separate electronics carrying region of the substrate foil.

7. The radiation detector according to claim 1, wherein a first detector of the plurality of detectors is configured for detecting radiation in a first energy range; and wherein a second detector of the plurality of detectors is configured for detecting radiation in a second energy range, the second energy range being at least partly different from the first energy range.

8. The radiation detector according to claim 1, wherein one detector of the plurality of detectors is an X-ray detector configured for detecting X-rays and arranged in a center region of the substrate foil; and wherein at least two detectors of the plurality of detectors are γ-ray detectors arranged on two opposite sides of the X-ray detector.

9. The radiation detector according to claim 1, wherein the at least one scintillation device of each detector of the plurality of detectors comprises a scintillation layer arranged on top of at least a part of the plurality of photosensitive pixels; and/or wherein an edge of the scintillation device is tapered.

10. The radiation detector according to claim 1, wherein each detector is flat.

11. The radiation detector according to claim 1, wherein each detector is bent only at the bending region.

12. The radiation detector according to claim 1, wherein both the addressing circuit and the read-out circuit are provided on one side of the substrate foil.

13. The radiation detector according to claim 12, wherein both the addressing circuit and the read-out circuit are provided as an electronic TFT backplane circuit.

14. The radiation detector according to claim 1, further comprising at least one light shield arranged on the substrate foil.

15. The radiation detector according to claim 1, wherein the substrate foil is arranged in a Z-like shape in at least one of the bending regions.

16. The radiation detector according to claim 1, wherein each neighboring detector of the plurality of detectors is brought closely together by folding the substrate foil at each bending region.

17. A method for producing a radiation detector, the method comprising:

providing a substrate foil and a plurality of detectors, each detector comprising a plurality of photosensitive pixels and at least one scintillation device optically coupled to the plurality of photosensitive pixels;

arranging the plurality of detectors on the substrate foil in juxtaposition with respect to each other, such that at least two directly adjoining scintillation devices of at least two directly adjoining detectors are spaced apart from each other by a gap, and such that the radiation detector is bendable along at least a part of the gap; and arranging a switch between two detectors of the plurality of detectors, wherein each detector comprises at least one of a separate addressing circuit for addressing the respective detector and a separate signal read-out circuit for reading-out signals from the respective detector; and the switch is configured to electrically interconnect and decouple the two detectors.

* * * * *